Dec. 19, 1961    J. BUGOSH    3,013,901
ARTICLE COATED WITH FIBROUS BOEHMITE
Filed Nov. 30, 1959    2 Sheets-Sheet 1

FIG. IA

INVENTOR
JOHN BUGOSH

BY *William D. Mason*
ATTORNEY

Dec. 19, 1961     J. BUGOSH     3,013,901
ARTICLE COATED WITH FIBROUS BOEHMITE
Filed Nov. 30, 1959     2 Sheets-Sheet 2
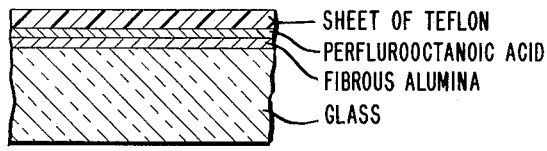
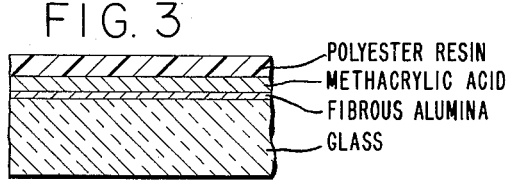
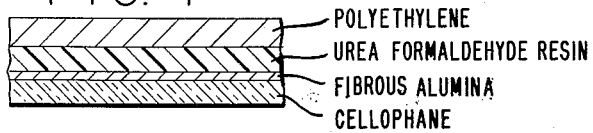
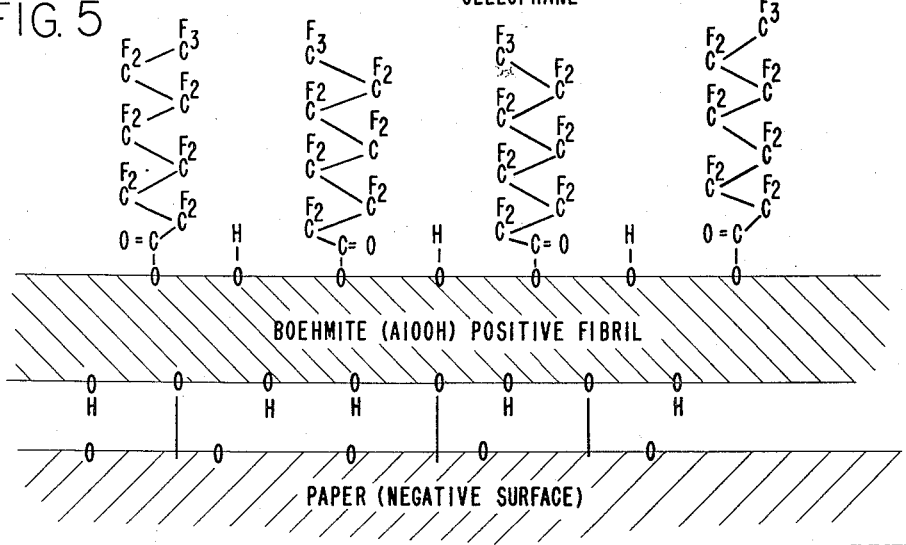
INVENTOR
JOHN BUGOSH
BY William B. Mason
ATTORNEY

United States Patent Office 3,013,901
Patented Dec. 19, 1961

3,013,901
ARTICLE COATED WITH FIBROUS BOEHMITE
John Bugosh, Wilmington, Del., assignor to E. I. du Pont de Nemours and Company, Wilmington, Del., a corporation of Delaware
Filed Nov. 30, 1959, Ser. No. 856,295
8 Claims. (Cl. 117—72)

This invention relates to base materials having negatively charged solid surfaces which have been coated with and bonded to fibrous alumina monohydrate and to methods of coating those surfaces. This invention further relates to those materials with coated surfaces having fibrous alumina monohydrate as an anchoring agent whereby said materials exhibit improved receptivity for subsequently applied layers of topcoat materials. Still further, this invention includes composite articles having a plurality of layers, at least two of which are secured to one another by fibrous alumina monohydrate as bonding and anchoring agents for negatively charged surfaces.

The present invention is thus broadly directed at a solid base material having at least one negatively charged surface to which a small but effective amount of fibrous alumina monohydrate, preferably in the form of a colloidal suspension or sol, has been applied and effectively bonded. The sol may be an aqueous sol containing $\frac{1}{100}$–25% by weight of fibrous alumina monohydrate. The solid base materials so treated display excellent anchoring for layers of topcoat materials subsequently applied and need only carry slightly more than a trace of the alumina in order to be so benefited in some instances.

Referring to the drawings:

FIGURE 1A is an enlarged view of the alumina-coated surface at A of FIGURE 1 with a copolymer, polyvinyl methyl ether-maleic anhydride, as a topcoating, anchored to the surface.

FIGURE 2 shows schematically in section a glass base material which has at its surface an effective amount of fibrous alumina monohydrate, as an anchoring agent, an intermediate layer of perfluorooctanoic acid and a topcoating of "Teflon" which has been sintered to form a continuous sheet.

FIGURE 3 shows schematically in section a glass base material having an effective amount of fibrous alumina monohydrate as an anchoring agent and an intermediate layer of methacrylic acid with a topcoat of a polyester laminating resin.

FIGURE 4 shows schematically in section a cellophane base material which has as its surface an effective amount of fibrous alumina monohydrate to anchor an intermediate layer of urea-formaldehyde resin with a topcoat of polyethylene.

FIGURE 5 illustrates schematically in section a paper base material having as an anchoring agent fibrous alumina monohydrate which effectively retains a layer of subsequently applied perfluorooctanoic acid.

Figure 1:
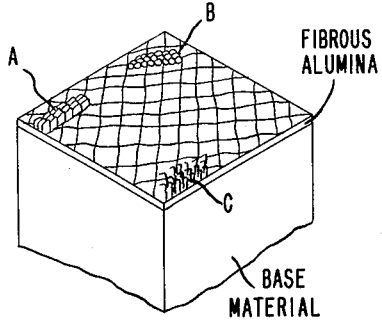
FIGURE 1 is a perspective view of a base material, with its upper surface coated with fibrous alumina monohydrate having the boehmite crystal lattice. Various topcoatings are applied at the areas indicated at A, B and C.
Figure 1:
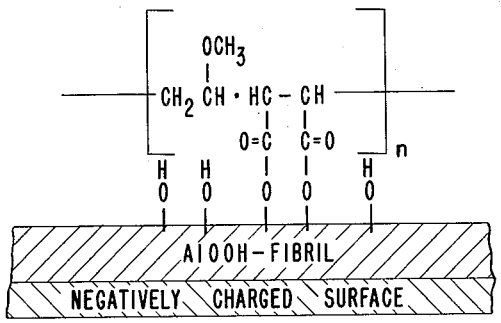
Figure 1B:
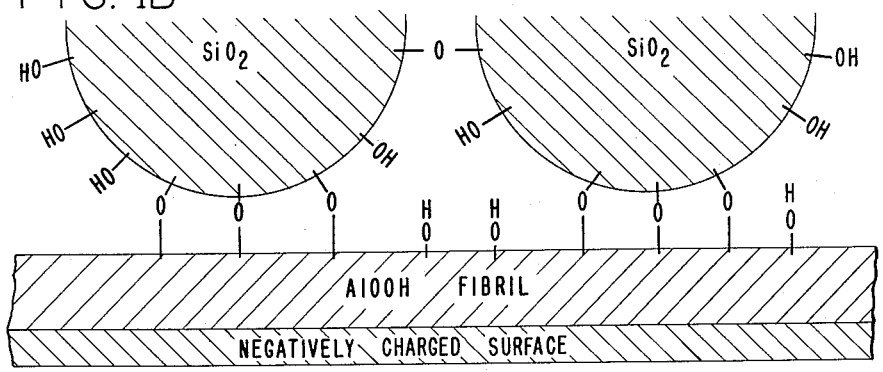
FIGURE 1B is an enlarged view of the alumina-coated surface at B of FIGURE 1 with a negative colloid, colloidal silica, as the topcoating.
Figure 1C:
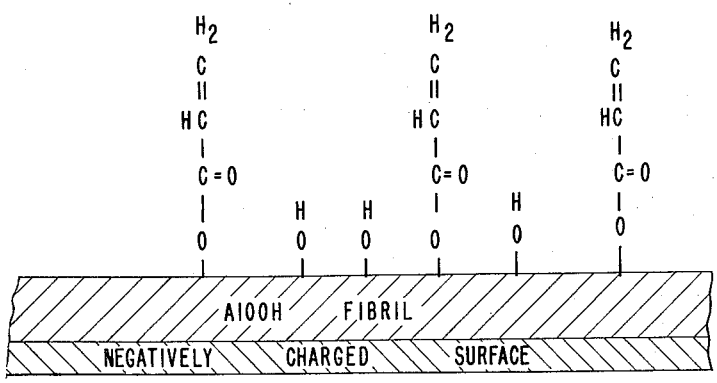
FIGURE 1C is an enlarged view of the alumina-coated surface at C in FIGURE 1 showing a polymerizable monomer, acrylic acid, bonded to the alumina. The topcoating of acrylic acid is shown as attached to the alumina through a typical ester linkage involving the loss of water.

This application is a continuation-in-part of my U.S. patent applications Serial No. 357,623, filed May 26, 1953, now abandoned; Serial No. 519,559, filed July 1, 1955, now abandoned; Serial No. 594,265, filed June 27, 1956, now abandoned; Serial No. 730,025, filed April 21, 1958, now abandoned; and Serial No. 783,602, filed December 29, 1958, and issued December 1, 1959, as U.S. Patent 2,915,475. This application is also a continuation-in-part of applications Serial No. 792,447, filed February 10, 1959, now abandoned; Serial No. 730,023, filed April 21, 1958, now abandoned; and Serial No. 809,883, filed April 29, 1959, now abandoned.

Details of the invention will now be given:

Base materials

In general, a solid base material to be coated with fibrous boehmite need have no special attributes. Physical characteristics such as density, porosity, surface-area, strength and the like, and chemical characteristics such as composition, natural or synthetic origin, and the like, are, in general, not significant.

It is preferred, however, that the surface to be coated of such solid base material be negatively charged with respect to the charge of the fibrous boehmite. This is because the fibrous boehmite will attach itself to negatively charged surfaces through bonding. Fibrous boehmite, which is positively charged, has an affinity for such negatively charged surfaces leading to electrostatic bonding between base material and fibrous boehmite. Such bonding may be greatly supplemented by actual electron sharing which involves both coordinate and covalent uniting.

Thus, when negatively charged surfaces are coated with sols or dispersions of positively charged fibrous boehmite according to the present invention, several distinct types of molecular forces may be involved in bonding the fibrils or aggregates to those surfaces. Those bonds due to opposite polar charges are concerned with Van der Waals' forces commonly having an energy of the order of 2,000–10,000 calories per mole. Chemical linkages through covalent bonds have an energy value of from 10,000–200,000 calories per mole. Coordination bonding approximates covalent bonding in strength. When more than a monomolecular layer of fibrous boehmite is coated on a surface, the hydroxyl groups present at the surfaces of the fibrils and other structural characteristics assist to permit the formation of multi-layered fibrils strongly bonded to the solid base material.

Generally, those base materials having negatively charged surfaces are characterized by having substantial proportions, that is, above 5%, of an element or elements selected from the group of oxygen, nitrogen, halogen and sulfur. These elements frequently are present in highly polar groups such as —OH, —NH$_2$, —COC, —NH—

—COOH, —SO$_3$H, and others. Such base materials which may be satisfactorily coated with fibrous alumina monohydrate include most of the principal industrially important organic and inorganic materials, and a representative list thereof is included below.

Those materials included herein which are not negatively charged or do not contain substantial proportions of highly charged polar groups containing oxygen, nitrogen, sulfur, halogens or the like can nevertheless be made highly receptive to fibrous alumina monohydrate and to that end can either be modified by the chemical incorporation of compounds which themselves have substantial proportions of such elements, or may be mixed or otherwise associated with other materials which have negatively charged surfaces. Thus, polymers and copolymers during manufacturing processes or aging periods may partially oxidize, or they may assimilate on or near their exposed surfaces certain compounds having free carboxylic, aldehyde, or other groups in sufficient amounts to impart negative characteristics to surfaces normally not high negatively charged. Further, natural and synthetic fibers, resins, and broadly those polymers and copolymers containing substantial amounts of nitrogen, oxygen, halogen and sulfur may be incorporated in fabrics, films, and other materials thereby presenting negatively charged surfaces which readily attract and bond with fibrous alumina monohydrate. Additionally, the surface oxidation of various metals, the formation of hydroxide or oxide films such as may also occur on the surfaces of many materials, lend negative characteristics, leading to the conclusion that the invention is generically applicable to the large majority of surfaces in general, and those surfaces which do not display negative characteristics may be modified so as to be negatively charged.

Thus, polymers such as polyethylene may be modified by the inclusion of their structures of isocyanates which impart negative characteristics. Other polymers and copolymers listed above may be modified by the inclusion of various compounds, as is well known in the art. Various rubbers, synthetic and natural may be further modified whereby their surfaces are markedly negatively charged. A good example of modified rubber will include polyester rubbers and acrylonitrile-butadiene-type copolymers and others. Further, surface oxidation and flame treatments of these surfaces will impart increased negative characteristics.

In particular, the following classes of substrates can be coated with fibrous boehmite for use in the processes and products of this invention:

(1) Fibrous products including natural and synthetic fibers of organic or inorganic origin may be woven together so as to form a fabric and fabric-like material as well as the fibers themselves.

The term "fiber" includes both inorganic and organic and synthetic and naturally occurring fibers. The term "fiber" includes staple, yarn, filaments, card sliver, twisted continuous filaments, top roping, roving, tow, stuffer box crimped tow, steam bulked tow, steam crimped continuous filament, two-component bulky continuous filament, yarn, spun yarns, and many others. It includes materials intended for use in fabrics in any stage of processing. The term "fiber" includes reinforcing fibers intended for plastic laminates, tire cord, and the like. The term "yarn" includes not only those yarns for textile usage, but also those for reinforcing other materials such as those yarns used in tire cord, rubber, conveyor belting and the like. The term "fabric" includes materials which are woven, knitted, fused or otherwise constructed from fibers; for example, the term "fabric" includes pile fabrics and paper fabrics.

Examples of natural fibers include cotton, flax (linen), hemp, jute, ramie, sisil, abaca, pharmium, silk, wool, fur, hair of all types (such as goat and horse), animal bristles of all types (such as hog and camel), straw, asbestos and the like.

Synthetic fibrous materials which may be used as the substrate include those made from polyamides, such as poly(hexamethylene adipamide), poly(hexamethylene sebacamide), polycaproamide, and copolyamides, polyesters and copolyesters such as condensation products of ethylene glycol with terephthalic acid, ethylene glycol with a 10/100 mixture of terephthalic/isophthalic acids, ethylene glycol with a 98/2 mixture of terephthalic/5-(sodium sulfo)-isophthalic acids, and trans-p-hexahydroxylylene glycol with terephthalic acid, polyacrylonitrile, copolymers of acrylonitrile with other monomers such as vinyl acetate, vinyl chloride, methyl acrylate, vinyl pyrridine, sodium styrene sulfonate, terpolymers of acrylonitrile/methylacrylate/sodium styrene sulfonate made in accordance with U.S. Patent 2,837,501, vinyl and vinylidene polymers and copolymers, polycarbonates, polyurethanes, polyesteramides, polyethylenes, polypropylenes, fluorinated ethylene polymers and copolymers (e.g. polytetrafluoroethylene), cellulose derivatives, such as cellulose acetate, cellulose triacetate, composite filaments such as, for example, a sheath of polyamide around a core of polyester as described in the copending application of Breen, Serial No. 621,443, filed November 9, 1956, and self-crimped composite filaments, such as two acrylonitrile polymers differing in ionizable group content spun as a sheath and core as described in the copending application of Taylor, Serial No. 640,722, filed February 18, 1957, regenerated cellulose, glass, and the like. Blends of two or more synthetic or natural fibers may be used as well as blends of synthetic and natural. The fibers and filaments may be crimped or uncrimped, drawn or undrawn, and/or bulked or unbulked. Two or more synthetic fibers with or without natural fibers may be blended. Other synthetic fibers include, for example, "Dacron" (a Du Pont trademark) polyester fiber, "Orlon" (a Du Pont trademark) acrylic fiber, "Zefran" (a Dow trademark) acrylic fiber; "Dynel" (a Union Carbide trademark) acrylic fiber; linear polyamides including nylons, "Teflon" (a Du Pont trademark) polytetrafluoroethylene, "Terylene" (a trademark of Imperial Chemical Industries) polyethylene terephthalate polymer, polyvinyl alcohol polymers, homopolymers, regular copolymers as well as graft copolymers, segmented elastomers, etc. The term also includes materials produced from derivatives and regenerated forms of natural polymers such as rayons and proteinaceous fibers as "Ardil," "Vicara," and the like made from casein, peanut protein and so forth. Glass fibers are excellent fibrous substrates for the processes and products of this invention.

Fibers of at least 15 denier per filament are especially useful substrates.

Not only can the fibrous boehmite be applied as a surface coating on individual fibers, but it can also be impregnated onto the surfaces of twisted threads and woven textiles. The treatment of such surfaces prevents the deposition and retention of soil and also beneficially modifies the surfaces with respect to the pick-up of static electricity. Other benefits which can be realized by surface treatment of fibers or textiles, especially of synthetic textiles, include reduced fuzzing or pilling and flammability, improved dyeability or printability, less glazing upon ironing, and improvements in mechanical processing properties.

(2) Solid plastics and elastomers, and films thereof, by which is meant those products which are cast, dipped or molded.

Among examples of solid plastics are resins like polymethylmethacrylate, such as "Lucite" (a Du Pont trademark); polyvinyl acetals, such as "Butacite" (a trademark of Du Pont); polyvinylalcohol, polyvinylacetate, polyethylene such as "Alathon" (a Du Pont trademark), polypropylene, polyvinyl chloride; polyvinylfluoride; polyvinylidene chloride; polystyrene; polytetrafluoroethylene; nylon resins such as "Zytel" nylon (a trademark of Du Pont); and the like.

Examples of elastomers include butadiene copolymers such as butadiene-styrene (GR–S types) and butadiene-acrylonitrile types, isobutylene-isoprene ("Butyl" rubber), polybutadiene, and polyisoprene, polychloroprene such as neoprenes; fluorocarbon polymers, for example hexafluoroprene/vinylidene fluoride such as "Viton A" (a Du Pont trademark); fluoroacrylic ester polymers, chlorosulfonated polyethylenes, such as "Hypalon" (a Du Pont trademark); polyurethanes; polyesters; polyester-amides; silicone-type elastomers, and the like.

The above plastics and elastomers may be used as solid masses formed by molding or casting, or as cast coatings on various substrates or as unsupported films.

Films which are particularly useful as substrates for fibrous boehmite topcoats in accordance with this invention are cellulosic films, such as regenerated cellulose, commonly known as cellophane; polyester films, such as "Cronar" (a Du Pont trademark) or "Mylar" (a Du Pont trademark), a polyvinylidene chloride such as "Saran" (a Dow trademark), rubber hydrochloride and isomerized rubber.

(3) Paper and paperlike products, by which reference is had to substrates in a sheet or sheet-like form made from natural and synthetic fibers and prepared by conventional mat-forming procedures.

Such paper and paper-like products can be prepared in conventional ways from organic, inorganic, or mixed organic and inorganic natural or synthetic fibers. The fiber component can be of almost any form. Usually, however, such papers are made from cellulosic materials derived from wood pulp or cotton although other cellulosic materials can also be used. Papers may also be formed from inorganic fibers such as glass, silica, asbestos, alumino-silicate fibers, and the like. Synthetic organic products which may be used in paper like products include acrylic types, for example, "Orlon" (a Du Pont trademark) polyesters, such as "Dacron" (a Du Pont trademark) and nylons.

Note that wood itself can be coated in accordance with the invention. Fibrous boehmite dispersion in organic solvents can be applied to wood surfaces prior to painting as a priming coat to improve adhesion of paint.

From, say, 1 to 25% by weight fibrous boehmite can be included in conventional paper surface coatings, the amount depending upon the magnitude of the effect desired. On photographic base paper, for example, fibrous boehmite can be applied as a subcoat and the coated paper can be treated in turn with a solution or dispersion of like sensitive agents, includeing silver bromide, and ferrocyanide compositions of blueprint papers or the diazonium salts used in diazotype papers in which a wetting agent has been applied to help spread the material on the paper. The fibrous boehmite gives better adhesion and definition of the print, and with colored inks, greater depth of shade. Fibrous boehmite can be used as an anchor coat for light sensitive films used in color photography. The fibrils of boehmite can stay dyed and serve as a color substrate.

For example, fibrous boehmite can be dyed while in water solution or in an appropriate organic solvent and the dyed fibers can be included into a basecoat or where it is desired to impart color as well as the valuable physical properties resulting from the use of fibrous boehmite.

(4) Naturally occurring organic products such as wood products like compressed wallboard, veneers, pressed chipboard, etc., leathers such as tanned hides or cured leathers, straw, coal, tobacco, growing plants (helps retain moisture on leaves).

(5) Ceramics, refractories and stone products, by which reference is had to all types of glass, both siliceous and non-siliceous; cement and mortar; structural clay products such as brick, tile, sewer pipe and clay refractories; pottery and related products such as vitreous plumbing fixtures, vitreous china food utensils, earthenware food utensils, porcelain electrical supplies, pottery products; cement and plaster products such as concrete and gypsum products, lime and mineral wool; cut stone and stone products; abrasive products such as silicon carbide, aluminum oxide, diamond, emery, silica, garnet, tripoli; asbestos products, such as asbestos-cement shingles and pipe, millboard, fabrics, insulation, brake linings, gaskets; non-clay refractories such as alumina, zirconia, silica, magnesite, mullite, chromite, and graphite.

Surface treatment of the above described inorganic substrates gives a variety of useful effects. For example, the chemical resistance of inexpensive refractories and ceramics can be improved by surface coating with fibrous boehmite. Thus, the alkali resistance of siliceous materials such as silica brick, glass fibers, glass containers is improved. Surface treatment of asbestos/cement shingles improves their copper strain and soil resistance. Surface treatment of a porous brick or tile reduces porosity, efflorescence and serves as an adherent base for glazes and enamels. Surface treatment of abrasives (followed by firing) results in better cutting action as well as better adhesion of the abrasive to a paper substrate or to the organic resin or inorganic binder in a cutting wheel.

(6) Metals of all kinds as well as alloys of these elements. Included are ferrous metals and alloys such as carbon steel, alloy steel, stainless steel, gray iron castings, malleable steel castings; copper and its alloys such as brasses and bronzes; aluminum, magnesium, lead, zinc, tin, cobalt, titanium, molybdenum and their alloys. The fibrous boehmite coatings can be put on the metal early in the manufacturing process, e.g. on the rig, bloom, billet, slab, bar, skelp, tube round; on semi finished shapes such sheets, wire, strip, black plate, tin plate, terne plate or on the finished fabricated metal article.

The fibrous coating can also be placed over an electrolytically, chemically or vapor deposited metallic coating. For example, the fibrous boehmite can be used to seal up the pores in a porous chromium plate to improve its resistance to pitting corrosion.

In order to get good adhesion between the metal and the fibrous boehmite film, in general, a pretreatment of the surface is desirable. Thus, the metal can be pretreated with conventional conversion coatings such as those based on phosphates, chromates, and the like. With aluminum for example, a particularly good subcoat for the fibrous boehmite is monoperphosphoric acid.

In general fibrous boehmite coatings on metals and metal products offer electrical insulation, thermal insulation, corrosion resistance, surface hardness increases. In addition fibrous boehmite basecoats tend to be transparent and are readily dyable, yet durable.

For example, such insulating fibrous boehmite coatings on silicon steel are useful in making transformer cores because these coatings cut down eddy current losses and act as a high temperature parting agent during annealing of the sheet steel. Yet, such coatings permit transformer cores having excellent high temperature characteristics and stability.

Fibrous boehmite coatings improve heat transfer characteristics and protect substrate surfaces (such as metals) during exposure to elevated temperatures.

Thus, fibrous boehmite coatings significantly increase the maximum heat flux between a heated solid surface (like metal) and a liquid, especially water or aqueous solutions, in boiling especially nucleate boiling. Heat flux, which is the rate of heat transfer per unit of area on the boiling side of a submerged heat transfer surface, is a function of temperature difference between submerged solid heat transfer surface and the boiling temperature of a liquid. The three stages of boiling are recognized to be nucleate, transition and film. It appears that fibrous boehmite coatings on heat transfer media extend the range of nucleate boiling into the range of temperature differences where film boiling normally occurs.

Fibrous boehmite coatings also protect substrate surfaces (such as metals) against attack by surrounding atmospheres, especially at elevated temperatures.

For example, in fabricating metals, undesirable changes occur especially in surface regions during exposure to elevated temperatures in oxidizing and reducing atmospheres. Oxidation, loss of alloying agents, decarburization, carburization, scale formation, internal oxidation, and the like are phenomena which have far reaching effects on product properties. By first coating metals with fibrous boehmite (which, as explained, bonds to such surfaces) before exposure to such elevated temperature conditions—say up to 500° F. and beyond—undesirable changes in surface regions are thereby minimized. Furthermore when the underlying metal is gradually oxidized at high temperature, the metal oxide film which is formed in contact with the alumina residue from fibrous boehmite, in some cases reacts with it to form a better protective layer than the metal oxide alone.

(7) Paints and finishes of all types. Included are conventional organic vehicle-based paints or finishes using alkyd or drying oil modified alkyd resins, melamine-formaldehyde, resins, polyacrylic ester resins, as well as paints using bodied and resin reinforced drying oils such as linseed oil, soya bean oil, and China-wood oil. Also included are lacquers, such as nitrocellulose and methacrylic ester types.

(8) Crystalline powders. Included are such materials as ammonium nitrate (coated with fibrous boehmite to improve compatibility with other components) and sodium chloride (to prevent caking).

(9) Solid foodstuffs. Included are such materials as cereals, chewing gum (retains moisture), candy, bacon (parting agent) and the like. Application of dilute solutions of soluble salts of fatty acids may be subsequently made to decrease the wettability, hygroscopicity and drying rate of foodstuffs during processing.

Fibrous boehmite is quite useful when incorporated either as a filler or as in situ mixtures with tobacco in cigarettes. At one to 10% concentration the products of this invention filter out a high percentage of the tars and other undesirable constituents of tobacco smoke and give a mild, free-burning, easily drawing cigarette.

*Fibrous alumina monohydrate having a boehmite crystal lattice*

Solely as a matter of brevity throughout this application, the term "fibrous boehmite" will often be used to refer to fibrous alumina monohydrate having the boehmite crystal lattice.

Fibrous boehmite itself is in the form of well-formed and sharply defined little fibers or fibrils. These fibrils have at least one dimension in the colloidal range and the fibril diameters in a particular product are usually quite uniform.

Various forms of alumina in sols, gels, etc., are known and the literature pertaining thereto is extensive. Fibrous boehmite, however, differs from such prior art in that the properties of this alumina enable it to be superior in adhering to negatively charged surfaces. These properties are summarized as follows:

(1) A high positive charge;
(2) An active surface, believed to be largely due to the presence of numerous hydroxyl groups on the surface of the fibrils;
(3) A fibrous structure with high specific surface area and fibril axial ratio which is very suitable for film formation. Fibrous boehmite films are transparent to translucent;
(4) A high heat stability—fibrous boehmite does not lose OH groups up to about 350 to 450° C. Yet, inorganic films formed with fibrous boehmite are capable of being insolubilized by moderate heating and are good protective coatings. A coating of fibrous boehmite on a heat resistant substrate will retain its integrity even above the temperature (400–500° C.) at which hydroxyl ions are removed and the crystal structure is transformed to gamma-alumina.

Fibrous boehmite is said to be positively charged because such material when in aqueous suspension tends to move to the negative electrode when subjected to a direct current voltage in an electrophoresis apparatus. This positive charge is apparent, for example, when an aqueous suspension has a pH between 1 and 6 adjusted with HCl.

While prior art aluminas show some of these properties in common with the alumina under consideration, none of the known aluminas possess all of these properties which are necessary to the present invention. Fibrous boehmite is thus distinct from the aluminum hydroxide, $Al(OH)_3$, which is used commercially as a mordant and other aluminas which may be used in coating various substrates. Inability of prior art aluminas to equal the herein described fibrous alumina monohydrate as an adherent to negatively charged surfaces and as an anchoring agent are attributed to the lack of one or more of the above enumerated properties. For instance, coatings of prior art aluminas do not have the permanence of fibrous boehmite when applied to negatively charged surfaces, nor are prior art aluminas capable of forming more than a mono particle or monomolecular layer on such surfaces. Fibrous boehmite monohydrate can be present as a monoparticle layer or it can form multimolecular and multiparticle continuous layers.

Fibrous alumina monohydrate having the boehmite crystal lattice can be prepared as a colloidal sol by heating an aqueous dispersion of certain aluminas under carefully controlled conditions in the presence of critical amounts of monobasic acids. The fibrous boehmite and processes for its preparation are described in detail, for example, in copending U.S. applications Serial Nos. 730,024, filed April 21, 1958, and especially 783,602 filed December 29, 1958, now U.S. Patent 2,915,475, issued December 1, 1959 (and all parent applications cited therein).

Fibrous alumina suitable in the present invention has an average fibril length in the range of from 25 to 1500 millimicrons, the remaining average dimensions being in the range of 3 to 10 millimicrons. The fibrils have a surface area of between 200 and 400 $M^2/g$.

Preferred fibrils for use in the processes and products of this invention have an average length in the range of from about 100 to 700 millimicrons, the remaining average dimensions being in the range of from 3 to 5 millimicrons, the axial ratio being from 50:1 to 150:1, and a surface area of from 250 to 350 $M^2/g$.

Further description of fibrous boehmite herein seems unnecessary, since this substance and its characteristics are fully disclosed and discussed in the aforementioned Serial No. 783,602, which material is incorporated herein by reference to the extent necessary.

Fibrous boehmite sols prepared according to the teachings of U.S. Patent application Serial No. 783,602, may contain in addition to the fibrous boehmite an acid radical which is generally associated with an aluminum ion or a basic aluminum ion. Such sols may be deionized. "Deionization" as used here refers to the removal of the acid radical, and in general, replacing it with a hydroxyl ion or, alternatively, removing the acid radical as the free acid, e.g. as HCl or acetic acid.

Fibrous boehmite sol or dispersion pH affects the quantity of material coated upon a substrate during a coating operation. If more than a monolayer of fibrous boehmite fibrils is to be deposited, the pH should be greater than about 7 (i.e. alkaline).

Strong acid radicals can be removed with an ion exchange resin, according to the teachings of U.S. Patent No. 2,733,205. They can also be removed as a salt by gelling the fibrous boehmite sol with a base and then filtering and washing until the salt of the strong acid radical is practically entirely removed. Preferably, the sol is gelled with concentrated $NH_4OH$ at a pH=10 while at 70 to 90° C., filtered hot and then washed with pH=10 water until anion free and then distilled $H_2O$. This deionization cake which generally contains from 5 to 15% $Al_2O_3$ can be reconstituted to an aqueous dispersion by agitating vigorously and if a more fluid dispersion is desired, a weak or strong monobasic acid can be added to lower the pH, e.g. to about 3.0 to 7.0.

Strong or weak acid radicals can also be removed from the aquasols by transferring the undeionized fibrous boehmite sols of U.S. Patent application Serial No. 730,025 to an organic liquid, e.g. butanol, followed by azeotropic distillation to remove water and then heating this organosol above the critical point of the organic phase and venting off the organic phase and the acid radical as the free acid. In this way, dry, fluffy, fibrous boehmite can be made which has about 95 to 99% less acid radical than present in the aquasol. An especially preferred procedure for removal of weak acids such as acetic acid from fibrous boehmite is to spray dry or drum dry.

Aqueous sols or dispersions of fibrous boehmite prepared as outlined herein will contain fibrils or aggregates of fibrils which are positively charged and are believed to possess numerous hydroxyl groups that impart surface activity. Whatever molecular structures may be generally inherent in these fibrils or aggregates, it is known that they attach themselves to negatively charged surfaces through bonding, and have an affinity for such surfaces initially prompted by opposite charges leading to electrostatic bonding, which may be supplemented by actual electron sharing in covalent or coordinate bonds.

In general, an aquasol or organosol of fibrous boehmite can contain from $\frac{1}{1000}$ to 25% by weight of the fibrous alumina monohydrate.

A more extensive description of fibrous boehmite and sols here seems unnecessary since they are fully disclosed in the applications Serial No. 730,025 and Serial No. 783,602 and the disclosure there given is incorporated herein by reference.

Complete descriptions of the various techniques used for physically characterizing fibrous boehmite fibrils are given in, for example, the aforenoted U.S. patent applications describing methods for the preparation of fibrous boehmite.

The fibrous boehmite used in the present invention can be in a dry state initially as individual fibrils or in slightly aggregated state. It may also be used as a dispersion in aqueous or organic systems. The fibrils or fibrous boehmite may be comparatively unassociated in dilute solutions or they may aggregate together to form a tactoid structure of a parallel lateral alignment to form fibrils when concentrated. These aggregates are quite desirable in some uses even though they are supercolloidal in size.

Fibrous boehmite, in addition to being dispersible in water, can be dispersed in organic solvents. A number of such solvents are described in U.S. patent application Serial No. 730,025.

The optimum amount of fibrous boehmite which should be present on any negatively charged surface depends in each instance on such independent variables as the composition of the basic material employed, the porosity or the lack of porosity of the material, the mode of application, the magnitude of the effect desired, and other factors as previously stated. Barely a trace will suffice in some applications. In most instances, however, the concentrations of fibrous boehmite on a substrate will range from about 0.01% to 5% by weight based on total weight of treated material, or even much higher, depending upon the particular needs of the user. The thickness of the fibrous boehmite coating will be at least a fraction of a monolayer of such boehmite (i.e. at least about 3 millimicrons). No upper limit on coating thickness is known, for the thickness of the coating is dependent upon so many variables such as desires of the user, charge on the substrate, pH of fibrous boehmite dispersion used in coating and like variables. Thus, thickness can range as high as a centimeter or even more. In most instances, however, thickness will be less than about 0.25 cm.

*Methods of coating with fibrous boehmite*

In general, coating a solid base material with fibrous boehmite can proceed in the way or ways already known to the art for the production of catings upon substrates. No notable change in manufacturing techniques need be made beyond the addition of fibrous boehmite to material intended for coating a given substrate.

Fibrous boehmite can be applied to surfaces in any variety of ways. For instance, a dispersion may contain from about $\frac{1}{100}$ to 25% by weight of fibrous boehmite. But usually a sol will contain from about $\frac{1}{10}$ to 3% by weight of fibrous boehmite. A preferred dispersion of fibrous boehmite is a dilute aqueous one which can be diluted or concentrated within the indicated foregoing ranges by the addition or removal of water. Broadly, negatively charged surfaces are contacted with the alumina solution and thereafter the coated surfaces are dried. The solution can be applied by dipping in a bath, spronging, spraying or rolling.

Instead of being applied through a liquid vehicle, surfaces can be coated with fibrous boehmite by using a dry composition through the use of vigorous rubbing, or otherwise bringing into intimate contact the fibrous boehmite and the surface to be coated.

In many cases, especially when topcoats are subsequently applied, it is advantageous to rinse the fibrous boehmite treated substrate to remove free and merely occluded fibrous boehmite, so as to leave on the surface only that boehmite which is held substantively, i.e., by forces of surface attraction. In other cases there is no harm in leaving excess dispersion on the surface so as to deposit a thicker layer of fibrous boehmite upon drying.

Fibrous boehmite can also be applied to substrate surfaces by electrophoretic deposition. For this purpose, it is desirable to reduce the electrolyte content of a fibrous boehmite sol or dispersion (preferably aqueous) to a low level so that most of the current passing through such sol or dispersion is carried by the boehmite particles themselves, and not ionically. Thus, the boehmite is deposited at the cathode in the form of a coating.

After the surfaces have been treated with a liquid containing alumina, the liquid evaporates in a preliminary drying step, leaving a deposit of fibrils or aggregates on the surface. Elevated temperatures, of course, accelerate this evaporation, but this preliminary drying step may be carried out over a long period of time if necessary at room temperature. A second drying step, carried out when practically all of the liquid has been evaporated, is preferably assisted by temperatures of 50° C. and above, but this second step is not essential in every application.

It is a most important advantage in that the processes of the present invention do not require prolonged heating since it has been found that the alumina anchoring agent normally is attracted to a negatively charged surface so that at least a monoparticle layer of alumina coats such a surface. Preferably, when the coated surface is substantially dry, it should be heated to a temperature of at least 50° C. in order to modify the alumina coating and more tightly anchor it to the surface being treated. Of course, the temperature of heating should be below the point at which the article will melt or sinter, and ordinarily a temperature of 50° C. over a long period of time will suffice in practically all instances. Subjecting the coated articles to a temperature of from about 100–150° or 200° C. for a shorter period of time, approximately 5–30 minutes, assists to more tightly affix the alumina to the treated surface. Higher temperatures and longer times are unobjectionable provided, of course, that the nature of the articles treated permits elevated temperatures. The boehmite itself can usually withstand temperatures of up to 400° C. without appreciable loss of hydroxyl groups.

Prior to treating negatively charged surfaces with an alumina sol, care should be taken to insure that the surfaces are clean and free from grease, finishes and other impurities. Conventional methods which remove such foreign matter may be satisfactorily employed.

If desired, a layer of topcoat material, preferably a negatively charged topcoat with respect to the boehmite, may be applied to the alumina-treated surface after the latter has received a heat treatment. Customary methods for the application of topcoat materials in the absence of an anchoring agent are suitable. In the case of topcoat materials which are applied as solutions, suspensions or emulsions, the surfaces of the base material may be heated to accelerate drying of the topcoat in addition to the alumina.

Extremely thin films of fibrous boehmite can be used to promote the adhesion of two dissimilar materials by providing high surface area anchor points. Thus, for example, fibrous boehmite films are used to promote the bond between a paint film and a metallic surface, between various polymer films such as "Mylar" (copolyester of ethylene glycol and terephthalic acid), or regenerated cellulose and other substrates such as metals, glass or other films.

Films of fibrous boehmite can be used as such or, as is disclosed more particularly herein, in combination with minor amounts of organic and inorganic materials to modify the properties of fibrous boehmite films. For example, the films can be modified with polyvinyl alcohol, polytetrafluoroethylene, polyethylene, terephthalate, polyethylene, and polyvinyl fluoride. Fibrous boehmite modified with from 5 to 25% of polyvinvyl alcohol, for example, shows improved heat stability, superior adhesion to glass and ferrotype and better hardness.

It has been stated that heat can be applied to fibrous alumina-treated surfaces in order to effect a tighter bond. It therefore follows that when a topcoating material is applied over the alumina-treated surfaces at the time such surfaces are substantially dry, the topcoating material may be heated before application to cause the alumina to become more tightly bonded to the negatively charged surfaces.

It may be desired to use wetting agents in many cases to assist contact between the sol or dispersion of fibrous alumina monohydrate and the surface to be treated. Conventional wetting agents of the nonionic or cationic type are suitable. Among those wetting agents found to be adapted for such use are the following:

Rohm and Haas:
    Triton X–100 (alkyl aryl polyether alcohol)
    Triton X–155 (alkyl aryl polyether alcohol)
    Lavapon WS–1 (alkyl aryl polyether alcohol)
    Triton CF–10 (alkyl aryl ether)
    Triton X–67 (alkyl polyether alcohol)

Sun Chemical Corp.:
    Warcosol NM–9 (alkyl polyethylene glycol ether)
    Sulfonole NO–9 (alkyl phenoxy polyoxyethylene ethanol)

General Aniline and Film Corp.:
    Emulphor ON–870 (polyoxyethylated fatty alcohol)

Additional wetting agents include:

Rohm and Haas:
    Hyamine 3104 (dimethyl di-docenyl ammonium chloride)
    Hyamine 1622 (disobutyl phenoxyethoxy ethyl dimethyl benzyl ammonium chloride)
    Triton K–60 or X–400 (stearyl dimethyl benzyl ammonium chloride)

and others.

*Subsequent treatment of the surface*

Surfaces treated as above described with fibrous alumina sols are frequently useful without further treatment, especially synthetic linear polymers in the form of filaments, fabrics, etc. However, fibrous boehmite coated surfaces can thereafter be treated with preferably a negatively charged topcoat material which will anchor to the fibrous boehmite basecoat through electrostatic, chemical, or physical bond.

The treatment to be made to the fibrous boehmite treated negatively charged surfaces as above described can include, as already stated, negatively charged additives which can be particulate or ionic. Examples of both classes will be mentioned below:

(1) Hydrophilic polymeric topcoatings can be applied. These will include such substances as water-soluble polymers or polymers which are water-soluble in the form of their alkali metal or ammoniacal salts, polymeric acids such as polyvinyl methyl ether-maleic anhydride copolymers, polyvinyl alcohol solutions, carboxymethyl cellulose and methyl cellulose, styrene/maleic anhydride copolymers, partially hydrolyzed polyvinylacetates, and a wide variety of other water-soluble polymers which have heretofore been used in water-based paints and other film-forming compositions. These hydrophilic topcoat materials can be included in highly swellable dispersions in water, since polyvinyl alcohol-polyvinyl acetate systems are more colloidal than soluble. The amounts to use in this and in the succeeding examples can vary widely but should be sufficient to give approximately a monomolecular coating on the article being treated. More can be used, if desired. The quantities, in any event, are about those normally employed in the prior art for forming films of the same polymers. When an article coated with fibrous boehmite is dipped into a solution or dispersion of one of these polymers, the sheet may receive a monomolecular layer on the alumina surfaces or more depending upon the viscosity and solids content of the topcoating solution or dispersion. Thus, the amount of polymer present may be so great as to give quite a thick coating of the polymer, or so small as to give even something less than a monomolecular coating. In any event, the amount to be used can be gauged entirely by the results desired, as is the case in the application of paint and polymer films generally in the prior art. Other coatings such as natural occurring gums, glues, casein, gelatin, etc. may be applied.

(2) Hydrophobic topcoatings can be given to the fibrous boehmite treated negatively charged surfaces in the same manner as above described for hydrophilic treatment. These include such treatments as the applications of alkaline (ammoniacal) solutions of shellac, waxes, etc., soaps such as sodium stearate, sodium palmitate, and other common soaps. Such topcoats on a negative substrate, e.g. glass bottles, help lubricate it and thus breaking of fibrous surface treated bottles is retarded. There also can be used water-insoluble dispersions or organic solutions of carboxylic acid polymers or their salts broadly such as acrylic, methacrylic, itaconic, fumaric, maleic, vinyl sulfonic, styrene sulfonic, or allyl sulfonic acid polymers and copolymers thereof with acrylic or methacrylic esters, acrylonitrile, vinylidene chloride, vinyl chloride, vinyl fluoride, vinyl acetate, styrene, butadiene, isoprene, chloroprene, glycidyl methacrylate, allyl glycidyl ether, and the like.

Similarly, organic solutions and aqueous dispersions, for example, latices, of polymers such as the following can be applied: natural rubber and synthetic rubber lattices like those of polychloroprene, polybutadiene, polyisoprene, and copolymers of butadiene with other vinyl compounds such as styrene, acrylonitrile, vinyl pyridines and the like, polystyrene and others.

Surfaces having hydrophobic characteristics are also useful for grease proofing, waterproofing, etc. Specific substances having high utility for grease proofing are highly fluorinated acids, especially such as perfluorooctanoic acid, and chlorofluoroacids.

(3) Topcoat materials such as negative colloids can similarly be applied to give interesting and useful surface effects. Thus, there can be used colloidal metals in aqueous systems such as lead, gold, silver, copper and cadmium. Metal oxide dispersions can also be used. These can be in organic or aqueous systems, though aqueous are preferred. Thus, colloidal dispersions of zinc oxide, silica, titania, tin oxide, cupric oxide, ferric oxide, and the like find application in this connection. Fatty alcohol phosphates, such as Du Pont's "Zelec" (trademark) NE or NK can be used as topcoats.

Colloidal or semi-colloidal lubricants such as graphite (aquadag-Acheson colloids) and molybdenum disulfide can be anchored to negatively charged substrates such as metals, ceramics and the like (using fibrous boehmite as the anchoring agent) to improve boundary lubrication and prevent seizing under high loads. In this case one uses a monoparticle basecoat film of fibrous boehmite upon the substrates and the material which improves lubrication and decreases boundary seizures is topcoated on the fibrous boehmite basecoat. Multiple layered coatings can be employed to give improvements in lubrication. Thus alternate layers of boehmite and graphite (or molybdenum disulfide) can be employed.

Not only does one obtain improved lubricity, but also improved electrical conductivity. Thus, the inside of television picture tubes can first be coated with a monoparticle layer of fibrous boehmite and then coated with a monoparticle layer of graphite. Great cost savings are thereby effected since only a monolayer of graphite is required. Furthermore, uniform deposits of graphite are obtained over fibrous boehmite substrates.

Colloidal inorganic siliceous compositions including such clays as bentonite, attapulgite, kaolin, etc., are especially adapted to be added as a topcoat to fibrous boehmite coated substrates.

The silica class embracing negative colloids are particularly interesting. A silica sol suitable for use according to this invention may be made by passing a solution of sodium silicate through an ion exchange resin such as in the process described in the patent to Bird, U.S. No. 2,244,325. A sol prepared directly by ion exchange according to the patent disclosure is composed of particles which are smaller than about 5 millimicrons in diameter. A suitable treatment to increase the particle size of such sols is to adjust the pH if necessary to within the range of 7–10.5 and thereafter heat and age the sols until the particles have reached the desired size. Suitable silica sols containing still larger particles may be made by processes as shown in Bechtold and Snyder, U.S. Patent No. 2,574,902.

Silica sols of high concentration which have the additional advantage of being substantially free of electrolytes are described in Rule U.S. Patents Nos. 2,577,465 and 2,577,464. Such sols are disclosed in the two aforementioned patents are highly useful and attracted by an alumina-treated surface. Another sol which can be used is a product made by repeptizing a conventional silica sol with alkali in accordance with the process of White, U.S. Patent No. 2,375,738.

The particle size of colloidal silica is preferably small, having a diameter of 7 m$\mu$ or even less, as disclosed in Alexander, U.S. 2,750,345, in some applications. However, particles of colloidal silica somewhat larger in size may be employed.

Other sols which can be used are those produced by one or more methods shown and described in the following patents: Voorhees U.S. Patent No. 2,457,971; Reik U.S. Patent No. 2,428,178; Broughten U. S. Patent No. 2,535,036; Marshall U.S. Patent No. 2,356,774; Trail U.S. Patent No. 2,572,578; Trail U.S. Patent No. 2,573,743; and Legal U.S. Patent No. 2,724,701.

(4) Flameproofing topcoatings may be applied to fibrous boehmite coated surfaces much in the same manner as the above topcoatings. The surfaces can be treated with various flameproofing materials such as dispersions of antimony oxide in water, chlorinated paraffin dispersions, ammonium sulfamate, sulfamic acid, and sulfamates generally in addition to polyphosphates, diammonium hydrogen phosphates, monoammonium dihydrogen phosphate, chloroalkyl phosphates, boric acid and others.

On photographic base paper, for example, fibrous boehmite can be applied as a subcoat and the coated paper can be treated in turn with a solution or dispersion of light sensitive agents, including silver bromide and ferro-cyanide compositions of blueprint papers or the diazonium salts used in diazotype papers in which a wetting agent has been added to help spread the material on the paper. The boehmite gives better adhesion and definition of the print, and with colored inks, greater depth of shade. Fibrous boehmite may be used as an anchor coat for light sensitive films used in color photography. The fibrils of boehmite can be dyed and serve as a color substrate.

Flameproofing and shrinkproofing agents can be modified by the inclusion of fibrous boehmite. When used alone or in conjunction with starches, boehmite serves as an effective stiffening agent for textile products. Likewise, creaseproofing, crushproofing and slipproofing agents for textiles can be improved by the addition of fibrous boehmite, to high degree. Slipproofing treatments provide dimensional stability, and fibrous boehmite will help to prevent shrinkage and dispersion of textiles during washing. For compositions designed to improve the mechanical properties of textiles, fibrous boehmite will be combined with a wide variety of emulsion or solution type polymers including rubber emulsions, urea-formaldehydes, melamine-formaldehyde, and phenol-formaldehyde resins, polyvinyl alcohol, polyvinyl acetate emulsions, and cellulose acetate. Softening agents for textiles, antistatic agents, and delusterants which are applied to the fiber surfaces can be incorporated with fibrous boehmite which provides bulk to the coating of modifying agent on the fiber surface. Fibrous boehmite can be mixed with solutions of cationic long chain compounds such as stearyl trimethylammonium bromide and other quaternary ammonium compounds commonly used as antistats.

(5) Topcoatings which impart antistatic properties to the various applicable base materials listed above may be applied. A specific antistatic topcoating such as the sodium salt of paranitrobenzoic acid may be used. In addition, glycolic acid, methyl vinyl ether/maleic anhydride copolymer and some of the other materials mentioned herein will incidentally be antistatic. Other antistatic agents known to those skilled in the art may similarly be applied. It should also be noted that for many applications the coating of boehmite alone gives sufficient antistatic protection.

(6) Topcoating materials may also include polymerizable monomers such as acrylic or methacrylic acid, for example. The polymerizable monomers can be secured to the fibrous boehmite treated surface using liquid solutions or dispersions and thereafter copolymerized with other polymerizable monomers which will interact with them, such as styrene, acrylic and methacrylic esters, acrylonitrile, vinyl acetate and vinyl chloride, vinylidene chloride, methylene malononitrile, maleimides, chloroprene and the like. Likewise, topcoats of maleic anhydride, itaconic acid, vinyl sulfonic, methylene malonic, vinyl benzene sulfonic acid, crotonic acid, fumaric acid, China-wood oil acids, or linoleic and linolenic acids and the like may be anchored to the fibrous boehmite fibrils and thereafter reacted with polymerizable monomers to provide coatings of excellent adherence.

(7) Cellulosic fibers, for instance, and other base materials may be first coated with an effective amount of fibrous boehmite as above described and subsequently treated with aqueous dispersions of conventional sizing agents such as tallow acids, long chain waves, oils and other topcoatings of sizing agents known to those skilled in the art. It has been found that such sizing agents display increased affinity for anchoring when fibrous boehmite is interposed between the sizing agents and the surface of the base material.

(8) Base materials having fibrous boehmite treated surfaces are particularly useful in effecting improved bonding between laminae and layers of materials and substances which normally cannot readily be caused to strongly adhere to one another. For instance, negatively charged surfaces of such base materials as cellophane, glass, "Dacron," "Orlon," nylon etc. (both fibers, sheets, woven fabrics, etc.), can be treated with fibrous boehmite as described above and subsequently receive a layer of a topcoat material which will adhere to such alumina and be receptive to an additional layer of a material which normally would not be strongly bonded to an alumina-treated surface. It will be apparent that a need for an anchoring agent will be desirable not only in cases where solids are to be joined by adhesives, but also in instances where a plastic coating is to be applied to the surface of a base material.

For example, the surface of "Mylar" (Du Pont's trademark for its polyester film) can be made receptive to a polyester adhesive by precoating the "Mylar" film with a thin layer of fibrous boehmite before applying the polyester adhesive. Such precoating is desirable in making laminates of "Mylar" with other materials, such as laminates of "Mylar" with cellophane, "Mylar" with paper, "Mylar" with polyethylene, and the like.

When various layers are being joined, a special problem is frequently presented because an adhesive having an affinity for one of the materials may have considerably less affinity for the other. This problem is solved by coating one of the surfaces with an anchoring agent of fibrous boehmite alumina in the conventional manner and thus effecting a bond between such alumina and the base material. Next, an intermediate material of an adhesive which is capable of being bonded and attracted to such alumina coating is secured to the first material. The intermediate layer while being bonded to the base material through such alumina is capable of being bonded to a topcoating.

As an example, glass can first be treated with fibrous boehmite, then a coating of perfluorooctanoic acid applied thereon, and thereafter a colloidal dispersion of "Teflon" can be applied to form a bonded laminae consisting of glass and "Teflon" which normally could not be satisfactorily joined using conventional methods and bonding agents.

It will thus be seen that when using the sodium or ammonium salt of perfluorooctanoic acid, the latter acid as the intermediate layer is attracted and bonded to the fibrous boehmite treated surface of the glass from a water solution and is also attracted and bonded to "Teflon." The "Teflon," of course, may be applied in any conventional manner and subsequently sintered to form a continuous sheet.

Another example involves coating glass with fibrous boehmite and then coating such alumina-treated surface with the ammonium salt of methacrylic acid. Thereafter a liquid polyester resin either of a water dispersion or as an organic solution can be applied to form a plastic laminae with a glass surface exposed opposite an exposed polyester surface. The methacrylic acid preferably should be applied from a neutralized water solution. The polyester resin can be quickly polymerized to form a continuous coating and an extremely strong bond is formed. It will be understood that the use of fibrous boehmite alone as an anchoring agent without the intermediate layer of methacrylic acid will effect a reasonably strong bond between the glass and polyester topcoating. However, by interposing a layer of methacrylic acid between such alumina and polyester, a laminae of very high strength is formed.

(9) Fibrous boehmite basecoats serve as excellent semi-permanent anchoring agents for chemicals having desirable odors or for chemicals which are capable of masking undesirable odors. Examples of such chemicals include the terpenes, aldehydes, esters and ketones.

(10) Application of fibrous boehmite to many negatively charged substrates increases the coefficient of friction over that usually associated with such uncoated substrates. In general, coatings which in thickness are equivalent to several widths of fibrous boehmite fibrils are employed. Preferred layers or coatings of fibrous boehmite for this purpose contain some fibrils standing on end—that is, perpendicular to the substrate surface.

In general, such preferred coatings are achieved by application to substrate surfaces of concentrated sols or dispersions of fibrous boehmite and causing such sols or dispersions to gel at such surfaces. One thus obtains a coating having a random, brush-like surface, rather than a smooth, continuous film-like coating such as is obtained by using thin coatings of fibrous boehmite.

Boehmite can also be used as the basecoat when applied in monolayers (i.e. thin films) as the anchoring agent for other materials which the art knows increase coefficients of friction. Such materials include the colloidal silicas, like those available commercially under the Du Pont trademark "Ludox."

For example, when fibrous boehmite is applied in the thick coatings above referred to on metal surfaces, the coefficient of friction is greatly increased. This property is very useful on such things as railroad rails, train wheels, and in general, between all impinging surfaces, one of which is metal. Thus, in belt driven apparatus of all kinds, both belt and shafts (or pulleys) in contact with one another are advantageously coated with fibrous boehmite.

When fibrous boehmite is used on textile fibers, fabrics, clothing and the like, many unusual and novel advantages result. For example, fibrous boehmite on cotton improves fiber strength and handability with the result that raw cotton fibers when coated with fibrous boehmite can be more rapidly processed with increased through-put.

One can apply fibrous boehmite to raw cotton from an aqueous sol or dispersion, for example, by merely spraying the sol or dispersion onto the crude, uncarded cotton in the picker hopper or at some other later stage in processing. Such dispersion can contain, say, from about ½ to 7% by weight of fibrous boehmite. Increase in fiber weight after treatment is in the range from about 0.1 to 3% by weight.

Other materials have been used in the past for this purpose, but they tend to be negatively charged and not exhaustible upon cotton fiber surfaces. Therefore, such materials tend to flake off, dust and not give durable effects. The fact that fibrous boehmite is of a fibrous nature allows less of this material to be used to obtain given effects on cotton, compared with prior art materials. The end result is that one obtains cotton threads of a given strength with fewer twists or obtains stronger cotton threads with the same number of twists by using fibrous boehmite coatings. In cotton tow treated with fibrous boehmite one obtains fewer ends down because fibrous boehmite increases the frictional characteristics of the cotton fibers as well as bonding the cotton fibers.

Another example of how fibrous boehmite increases frictional characteristics is in coating paper—especially cellulosic papers, such as boxboard, and kraft papers. For this purpose, the fibrous boehmite can be applied as a spray using a sol or dispersion prepared as described earlier upon the paper surface. Usually a multilayered coating of fibrous boehmite will be used. Alternatively, application by roller coating can be utilized to apply this fibrous boehmite using these same strength sols or dispersions. Application rates generally effective are in the range of 0.1 to 1.0 lb. fibrous boehmite per 1,000 sq. ft.

In addition to improvements in surface frictionizing, one also obtains increases in ink savings in printing labels or the like on such treated paper (cartons or the like) because the film forming fibrous boehmite fills up the tiny voids on paper surfaces normally occurring on paper surfaces. Furthermore, ink colors (in the pigments used) employed in printing are intensified because all of the color remains on the outermost paper surface. Besides improving inkability, fibrous boehmite retards soiling of the surface.

When "Dacron" (Du Pont's trademark for polyester fiber) "fiber fill" is treated with fibrous boehmite, interesting results are obtained. Such application is accomplished as just described by spraying sols or dispersions of fibrous boehmite upon the surfaces. Then the treated material is baked at about 150° C. for from 5 to 10 minutes. The fiber fill product obtained has higher bulk density, e.g. when made into a pillow, than untreated product. Such density is retained even after repeated flexing (compression).

When fibrous boehmite is coated onto wool by using the same general techniques of spraying, the sleaziness of the coated wool is greatly reduced and the slightly increased fiber harshness renders it more easily twistable and feltable.

Other surfaces can also be treated advantageously with fibrous boehmite in order to increase the surface coefficient of friction, for example, waxed surfaces, glass, ceramics, like terrazzo. The surfaces of paper, such as is used in paperboard cartons and kraft bags are advantageously coated with fibrous boehmite, and when so coated these paper articles are made slip-resistant. Thus, bags can be piled higher on the pallet safely when treated with fibrous boehmite without slippage and breakage.

The surface of cellophane and other polymeric organic films can be similarly treated.

Fibrous boehmite coated substrates have anti-soiling properties which are especially useful on substrates susceptible to permanent soiling or inaccessible to cleaning by conventional methods, such as dry wiping, scrubbing with soap or detergent and water, and the like. The outstanding anti-soiling properties afforded by fibrous boehmite coatings are of a permanent or semi-permanent character. Fibrous boehmite treated surfaces can be repeatedly soiled and cleaned, as by vacuuming or dry wiping, with little or no loss of the effectiveness of the anti-soiling protection. The fibrous boehmite coatings resist removal by very severe cleaning techniques, such as by scrubbing with hot water over several cycles of soiling and cleaning; yet, even thereafter the treated surfaces offer excellent resistance to soiling.

Fibrous boehmite alumina sols were prepared as follows:

A. A basic aluminum chloride solution with a mol ratio of $Al_2O_3:Cl$ of 1:1 was prepared from aluminum metal and aluminum chloride. The preparation was carried out in a 12-liter, 3-neck round bottom flask fitted with a reflux condenser, thermometer, agitator, and heating mantle. Four thousand grams of distilled water was added in the flask. In this distilled water 965.76 grams (four moles) of aluminum chloride hexahydrate was dissolved. To this aluminum chloride solution was added, with agitation, 539.4 grams (20 moles) of ether extracted aluminum metal dust, over a period of about 10 hours and at a temperature ranging from about 75° C. to about 95° C. The final basic aluminum chloride solution was very slightly opalescent and had a pH of 3.5. Chemical analysis of this solution showed that it contained 22.80% $Al_2O_3$ and 7.59% chloride (by weight) which corresponds to an $Al_2O_3:Cl$ ratio of 1:1. The value of $\theta$ was under one minute.

This concentrated basic aluminum chloride solution was diluted to a concentration of about 2% $Al_2O_3$. This solution was then autoclaved at 160° C. for one hour. The resulting product was a stable, opalescent sol which showed intense streaming birefringence between crossed polaroids and had a pH of 3.78. Chemical analysis of this product shows it contained 2.14% $Al_2O_3$, 0.65% Cl which corresponds to an $Al_2O_3:Cl$ mol ratio of 1.14:1. The amount of amorphous alumina present in this sol is determined by methods described above as 26.0% by weight. An electron micrograph at a magnification of 50,000 diameters showed that the sol contained a fibrous boehmite alumina.

The specific surface area of the fibrous boehmite in the sol was 382 $M^2/g$. as determined by nitrogen adsorption.

The sol obtained by autoclaving was deionized with an anion-exchange resin in the bicarbonate form, the resin being the bicarbonate form of a quaternary ammonium ion-exchange resin, "Naclite SAR." The sol was deionized from a pH of 3.78 to a pH of 5.51 using 445 grams of wet, drained anion-exchanger.

Chemical analysis showed that the sol contained 1.86% $Al_2O_3$ and 0.06% Cl, by weight. This corresponds to a mol ratio $Al_2O_3:Cl$ of 11:1. As determined by X-ray analysis, only boehmite alumina was present. The sol was stable and slightly opalescent. The specific surface area of the alumina in the sol, determined by nitrogen adsorption, was found to be slightly less than 400 $M^2/g$. This method of preparation may be found on pages 153 and 154 of application Serial No. 594,265.

Similar sols of different particle size, specific surface and fiber dimensions may be made by varying the process conditions as described further in U.S. application Serial No. 783,602, filed December 29, 1958.

B. A second fibrous boehmite alumina sol was prepared in accordance with a disclosure given in Example 22, page 165, using as a starting material a basic aluminum chloride solution described in Example 15, page 155 of the above-referred-to application Serial No. 594,265. The specific surface area of the alumina in the sol was found to be about 300 $M^2/g$.

C. Alumina sols, where the alumina fibrils are substantially the same in dimensions, surface area, etc., as those prepared in A and B above may be prepared from an alumina gel.

An alumina gel was precipitated by simultaneously metering an alum solution containing 1 part $$Al_2(O_4)_3 \cdot 18H_2O$$

and 2 parts distilled water and a sodium carbonate solution containing 1 part $Na_2CO_3$ and 4 parts distilled water into the agitated reaction mass in an open tank. The reactant ratio, $CO_3/Al$, was maintained at $1.63 \pm 0.02$ (molar basis) at all times during the precipitation. After precipitation the gel slurry was transferred to a filter Nutsche and filtered using vacuum. The filter cake was washed on the Nutsche using nine successive washes of distilled water at 80° C. Each wash volume was approximately equivalent to the volume of the filter cake. The washed cake was homogenized by mixing 3151 parts cake with 1500 parts water in a laboratory Waring Blendor. This homogenized slurry analyzed as:

| | Percent |
|---|---|
| $Al_2O_3$ | 6.08 |
| Na | 0.002 |
| $SO_4$ | 0.077 |

The alumina content here and in the product will be expressed as percent $Al_2O_3$, although this does not necessarily show the degree of hydration in a specific aluminum compound present.

To 2790 parts of slurry, 82.5 parts glacial acetic acid and 627 parts distilled water were added and the mixture heated to boiling and refluxed for five minutes. This boiled-out slurry was then charged to a stirred autoclave, brought to 160° C. in 8 minutes, held at this temperature for one hour, and then cooled to 70° C. within 10 minutes and discharged. The product was a translucent fluid sol with fibrils about 330 millimicrons long and having a specific surface area of 296 square meters per gram.

D. The sol from C is dried by atomizing the sol and bringing the atomized droplets into contact with a hot gas stream, air. The spray drier is of conventional design employing co-current air flow and a two-fluid atomizer. The inlet temperature is 500° F., and the exit temperature is 134° F. The drying rate is 180 lbs. per hour with a nozzle pressure of 70 p.s.i.g. The dry product analyzes as:

|   | Percent |
|---|---|
| $Al_2O_3$ | 67.5 |
| HOAc | 8.6 |

This dried product is 100% redispersible in water and the alumina may be concentrated as desired. See application Serial No. 730,026 for further details.

The following examples illustrate the various applications of fibrous alumina monohydrate. Conventional methods of removing or adding water to concentrate or dilute the products prepared according to A–D are employed.

EXAMPLE 1

This example illustrates the use of boehmite alumina to anchor a long chain carboxylic acid to a cellulosic substrate to obtain water and oil repellency. A light unsized paper is dipped into a 2% fibrous boehmite alumina sol prepared according to method C above. The saturated paper is dried for 10 minutes at 110° C. It is then dipped into an aqueous 1% dispersion of perfluorooctanoic acid made by dissolving the acid first in isopropanol and then adding the solution to water with rapid agitation. The paper is again dried for 10 minutes at 110° C. When tested by the standard drop roll-off test, Method 5526, Federal Specification CCC–T–191B, paper so treated shows excellent water repellency. Similarly, the treated paper shows very good grease repellency as measured by the time in seconds (>1800 sec.) required for turpentine to penetrate a test piece according to TAPPI Standard Test T–454m–44 and by lack of migration laterally. When ordinary alum solution containing an equivalent amount of alumina is used in place of fibrous boehmite alumina, the paper is wet immediately when water is dropped on it. Grease repellency is likewise poor, less than 15 seconds being required for penetration by turpentine.

A wool gabardine treated with fibrous boehmite alumina by dipping in a 2% solution, wringing out and drum drying at 240° F. and then dipped in a 1% aqueous dispersion of perfluorooctanoic acid and drum dried again also shows excellent water repellency. A high degree of resistance to soiling by oils or greases is also shown in tests with Nujol, olive oil and SAE 20 oil. Water repellency is retained to high degree even after dry cleaning in "Perclene" perchlorethylene containing 1% of dry cleaning soap.

EXAMPLE 2

This example illustrates the use of alumina as an anchor for polyvinyl alcohol coatings for greaseproofing paper and increasing its wet strength. A 24 pound 100% rag paper stock is first sized by dipping into 2% sol of fibrous boehmite alumina prepared according to C above. After removing from the bath it is pressed to remove excess sol and dried for 5 minutes at 105° C. A 3% solution of polyvinyl alcohol Du Pont's "Elvanol" grade 72–51 is applied by padding, and the coated paper is dried in a tunnel dryer at approximately 90° C. The paper is much superior in wet strength and burst strength to one treated similarly with polyvinyl alcohol alone.

In another case, a 2% alumina sol is applied to paper by size press. After drying, a coating of polyvinyl alcohol "Elvanol" 72–41 is doctored onto the paper from a 16% aqueous solution to give a film thickness of approximately 2 mils when dry by festooning in an oven at temperatures up to 95° C. The polyvinyl alcohol coating adheres much more strongly to the alumina-treated paper than to untreated paper and in practical package tests shows superior tear and burst strength.

EXAMPLE 3

Two 8" x 8" pieces of scoured broadcloth fabric made from "Dacron" polyester staple fiber are soaked for 3 minutes in a 1% sol of fibrous boehmite alumina prepared as described in C. The fabrics are lightly wrung in a hand wringer and dried 20 minutes in an oven at 125° C. The fabrics are then washed lightly in a 0.125% aqueous solution of "Duponol" ME detergent for 15 minutes at 60° C., rinsed in distilled water and air dried. These fabrics have a 1.4 and 1.5% coating of alumina as determined by weight increase. The piece of fabric having a 1.4% fibrous alumina coating is further treated by soaking 3 minutes in a 20% aqueous solution of polyvinyl methyl ether/maleic anhydride (PVM/MA). The fabric is lightly wrung through a hand wringer and then dried 30 minutes in an oven at 125° C. The fabric is washed in a 0.125% aqueous detergent solution, rinsed in distilled water and air dried. The fabric increased 0.4% in weight by this treatment.

The logarithm of the resistance (log R) of the fabric, which is a measure of the antistatic properties, measured at 70° F. and 65% relative humidity, is 10.2 for the fabric coated with alumina and 11.0 for the fabric coated with alumina and PVM/MA as compared to 15 for the untreated "Dacron" polyester fiber fabric. After washing the coated fabrics three times in 0.125% aqueous "Ivory" soap solution for 15 minutes at 60° C. and rinsing in distilled water, the log R is 13.6 for the alumina coated fabric and 12.4 for the fabric coated with both alumina and PVM/MA. After an additional three washes in 0.125% "Tide" detergent solution and rinses in distilled water, the log R of the fabrics is 12.4 and 11.2, respectively.

In a test to measure the ease of removing oily soil from fabrics, the alumina-treated fabric has a washability index of 58 and the fabric treated with both alumina and PVM/MA has a washability index of 66. The washability index is a relative measure of the ease of removing oily type soil from a fabric on a scale where "Dacron" polyester fabric is rated as 0 (oily soil is difficult to remove) and cotton fabric is rated as 100 (oily soil easy to remove).

EXAMPLE 4

This example illustrates the fixing of an acid dye to the surface of "Dacron" polyester fiber. A swatch of "Dacron" cloth is dipped into a 2% sol of fibrous boehmite alumina having a surface area of about 400 $M^2$/g. prepared as described in A. The excess sol is removed by pressing and the cloth is allowed to partially dry. This alumina-treated cloth, together with an untreated control, is then dipped into an aqueous 0.1% eosine (yellowish, water-soluble type) dye solution and finally dried. Each of the swatches is then placed in boiling water for 10 minutes in separate beakers. The control swatch, that is, the one containing no alumina, loses its color almost immediately, whereas the test sample with the alumina is essentially unaffected and the water is still clear after boiling. Similar results are obtained when a fiber glass cloth, cotton fabric, unsized filter paper, and "Orlon" acrylic fiber cloth are treated with fibrous boehmite alumina and then dyed with eosine and other acidic dyes such as Orange II, with direct dyes such as Pontamine Sky Blue 6B, and mordant type dyes such as Pontachrome Blue Black RM.

EXAMPLE 5

This example illustrates the use of fibrous boehmite alumina as an anchorage agent for methacrylic acid in bonding a polyester resin to glass fiber cloth. A type 181 glass fabric cloth is dipped into a 0.25% sol of fibrous boehmite alumina prepared as in C and then thoroughly dried at 110° C. This treated glass cloth is then dipped into a 0.5% solution of methacrylic acid, removed, and again thoroughly dried at 110° C. A 12 ply laminate lay-up is made according to military specification MIL F–9118 using Selectron 5003 polyester resin marketed by Pittsburgh Plate Glass Company. The laminate made from the alumina treated glass cloth has a dry flexural strength of 56,000 p.s.i. and a wet flexural strength after 2 hours' immersion in boiling water of 34,000 p.s.i. A control laminate using no coupling agent at all yielded a dry flexural strength of 50,000 p.s.i. and a wet flexural strength after immersion in boiling water of 28,000 p.s.i. In place of methacrylic acid, alkali, ammonia or amine salts of methacrylic acid may be used with boehmite alumina treated glass with generally improved wet strength. With such salts it is preferable to wash the heat dried fabric-alumina-methacrylic salt combination with water to remove any excess water soluble salt before making the lay-up.

EXAMPLE 6

This example illustrates the use of alumina in bonding a water repellent coating to cotton. A swatch of cotton fabric of plain weave weighing 6.5 oz./sq. yd. is immersed in a fibrous boehmite alumina sol prepared according to procedure B and containing 1% fibrous boehmite alumina and then dried at 110° C. for one hour. This alumina-coated cotton fabric is then immersed in a bath containing a 0.1% solution of sodium stearate for a few minutes to allow complete penetration and thereafter it is dried at 110° C. The cotton is no longer hydrophilic but shows a high degree of hydrophobicity as demonstrated by excellent water repellency. Repellency is retained even after dry cleaning or after washing in soap solutions.

EXAMPLE 7

This example illustrates the use of fibrous boehmite alumina in converting the normally hydrophobic porous surface of a polyurethane blown sponge to a permanently water wettable porous surface. A hydrophobic polyurethane sponge containing small interconnecting pores is immersed and squeezed for one minute in an aqueous sol containing 2.8% fibrous boehmite alumina made by dispersing 2.8 parts of dry boehmite alumina powder, prepared according to method D, in 97.2 parts of water. The saturated sponge is removed and wrung out to eliminate the excess sol. It is then placed in an air circulating oven and dried at 110° C. for one hour. This treated sponge is very hydrophilic and absorbs water rapidly. When immersed in water and squeezed, the pores take on sufficient water to cause the sponge to sink. A control sponge with no alumina treatment will not absorb or wick up any appreciable amount of water. A sponge similarly treated with an equivalent amount of alumina in the form of aluminum sulfate solution does not become hydrophilic and will not absorb water in the manner of boehmite alumina treated product.

Polyurethane sponge treated in the above manner loses its hydrophilic, water absorbent properties immediately in contact with solutions containing ordinary long chain soaps such as sodium stearate. To prevent deactivation of the alumina surface, a topcoat of a water-soluble anionic methyl vinyl ether/maleic anhydride available from General Aniline & Film Corporation as PVM/MA is applied. The alumina coated sponge is simply immersed and squeezed in a 2% solution of the latter, removed and wrung out and dried for 1½ hours at 110° C. This sponge is hydrophilic and remains so when used in contact with soap solution. Even on boiling in a soap solution the hydrophilic character is retained. In place of methyl vinyl ether/maleic anhydride copolymer, other water-soluble or dispersible hydrophilic polymers, both organic and inorganic, can be anchored to the alumina to achieve similar results. Examples of such polymers are polyvinyl alcohol, sodium carboxymethyl cellulose, methyl cellulose, sodium cellulose xanthate, cyanoethyl cellulose, and a colloidal silica sol such as an aqueous dispersion of 7 m$\mu$ amorphous silica spheres commercially available as "Ludox" SM colloidal silica (a Du Pont trademark).

EXAMPLE 8

A base film of unstretched polyethylene terephthalate (1) is passed continuously through an aqueous treating bath containing 3% colloidally dispersed fibrous boehmite prepared as in C above and thereafter dried. The resultant dried polyethylene terephthalate base film retained 1.0% fibrous alumina monohydrate. Film (1) and an untreated polyethylene terephthalate base film (2) are coated conventionally with polyethylene by the procedure described in TAPPI 39, 366 (June 1956). The laminate prepared with the use of the anchoring agent has a superior bond when compared to a similar laminate prepared without the use of fibrous alumina monohydrate as an anchoring agent.

This superiority is demonstrated by immersing test strips of the respective films in boiling water. The laminate (2) prepared without the use of the adhesion promoters starts to separate within about one minute in boiling water and is completely separated within about five minutes. On the other hand, the laminate (1) prepared with the fibrous alumina monohydrate anchoring agent shows no signs of separation after 15 minutes in boiling water.

The peel heat-seal strength, a measure of the bond strength determined by the force required to pull apart the base film and polyethylene topcoating, of (1), when sealing coated-to-coated sides, is at least three times greater than that of (2).

EXAMPLE 9

This examples illustrates the use of alumina as a base coat for adhering decorative or protective coatings on aluminum, steel and other metals. A piece of ⅛ inch 2S aluminum sheet is thoroughly cleaned with 5% sodium hydroxide solution and 5% nitric acid solution and dried. This clean slightly oxidized surface is then immersed in a solution of 3% sol of fibrous boehmite alumina sol, made by method C, at 25° C. The aluminum sheet is removed and allowed to drain and dry at room temperature. It is then immersed in a warm (60°–70° C.) colloidal silica sol containing 7 m$\mu$ amorphous silica spheres ("Ludox" SM) for 20 minutes, removed, thoroughly dried at 110° C., and then baked at a progressively increasing temperature from 150° C. up to 350° C. over a period of one hour. The resulting coating is extremely hard, adherent and abrasion resistant compared to the uncoated aluminum metal.

The piece of aluminum metal treated as described above but without the subsequent silica treatment is used for fixing acid dyes. Another piece of aluminum metal treated as described above but without the subsequent silica treatment is used for fixing negatively charged colloidal graphite. The resulting increase in lubricity is readily apparent by merely running a finger tip over treated and untreated surfaces. Multiple layers of graphite can advantageously be applied for improved lubrication by alternating the graphite with fibrous boehmite layers. Instead of using graphite layers, layers of molybdenum disulfide can be advantageously employed on top of fibrous boehmite, with both improvements in lubricity and diminished tendency to seize under high pressure being observed.

Highly decorative effects are obtained through the use of fibrous boehmite alumina coatings on aluminum and other metals for fixing and bonding acid, direct or mordant dyes, or negatively charged pigments. Thus, an aluminum sheet coated as above but heated at 150° C. for one hour after drying is readily dyed in attractive red color by immersing in a 0.5% eosine water solution. The dyed surface retains its color when subjected to repeated water rinses.

EXAMPLE 10

*a.* A fabric of undyed "Dacron" polyester fiber is dipped into a 1% by weight solution of a fibrous alumina monohydrate (boehmite) prepared according to C and after excess liquid is expressed with a wringer, dried at 150° C. for two minutes. The dried fabric has the same appearance as untreated material.

b. A piece of fabric from a is immersed for two minutes in a 1% by weight solution of 2,2',4,4'-tetrahydroxybenzophenone (ultraviolet absorber) in methanol. After wringing, the treated fabric is dried at 100° C. for two minutes. The dried fabric is lemon yellow in color. The ultraviolet screening effectiveness of this combination is superior to control, c, below.

c. (control) A piece of undyed "Dacron" polyester fabric is treated with a 1% by weight solution of 2,2',4,4'-tetrahydroxybenzophenone in methanol. After wringing and drying as in b, the fabric shows only a slight tinge of yellow.

EXAMPLE 11

This example illustrates the use of fibrous boehmite alumina as an anchorage agent to fix a perfluorocarboxylic acid to leather in order to render it water and grease repellent. A sheepskin of the type commonly used for making suede leather is used for this example. This skin is tanned by methods known in the art with a reduced chrome tan available commercially as Tanolin-R, and this is followed by a normal fatliquoring treatment. The drum is drained. A colloidal dispersion of alumina is made from the powder described in procedure D above by adding the alumina slowly with good agitation in a separate vessel to the water until a concentration of 5% alumina is obtained in the dispersion. This dispersion is then added to the drained drum in an amount corresponding to 120% by weight of the dispersion on the weight of the skins in the drum. The skins are then drummed for one hour. The drum is drained to remove any excess unadsorbed alumina and an equivalent amount of fresh water is added. An amount of the ammonium salt of perfluorooctanoic acid corresponding to 5 pounds of ammonium perfluorooctanate per 100 pounds of skin is added to the drum. This mixture is drummed for one hour. The drum is then drained and the skins horsed up and drained further, a conventional finishing treatment wherein the skins are wrung, hung, and wet back to 10–11% moisture content. After this the skins are staked, buffed and brushed.

These soft and pliable suede skins are found to be water repellent, grease- and stainproof, and furthermore are dry cleanable. In addition, because of the colorless nature of the alumina perfluorooctanoic acid treatment a variety of shades of dyes can be used.

EXAMPLE 12

This is an example of the use of fibrous boehmite alumina as an anchor coat and filler for porous structural materials such as brick, concrete, wood, terazzo, plaster and the like. As a typical example, conventional red clay 9" bricks are spray coated as they are being removed from the kiln and while still hot with a 0.5% fibrous boehmite alumina sol made as described under procedure C. The water is flashed off leaving a thin film which partially closes and penetrates the pores at the surface of the brick. In practice such brick are used for structural purposes in conventional manner, and in order to obtain a water-repellent surface in the final structure a wash of dilute soap solution is applied. This wash with soap solution usually follows the practice of washing down with muriatic acid to prevent efflorescence of occluded salts. After the surface has dried following the acid wash, a soap solution consisting of 0.1% sodium stearate is applied. After it has once dried it is hosed down with water to remove soluble sodium salts. The resulting dry surface is now highly water repellent and retards penetration of moisture into the interior of the structure. Similar desirable hydrophobic effects can be obtained on concrete highways, buildings, sidewalks, on plaster, wood, ceramics, terrazzo and like materials, coating first with alumina and following with a long chain fatty acid soap treatment. In place of long chain soaps other anionic materials may be adhered for diverse effects. Polycarboxylic acid resins and copolymers of polymerizable carboxylic and sulfonic acids are particularly valuable for sealing and decorative purposes.

EXAMPLE 13

Polyethylene terephthalate as disclosed in U.S. 2,465,319 having an intrinsic viscosity of 0.6 is melt spun, drawn, and crimped to give a tow having a total denier of 25,000 and composed of filaments having an average denier of 3.0. The two is washed by soaking in carbon tetrachloride for about 20 minutes and air dried. It is then immersed in an acetate stabilized 1% sol of fibrous alumina monohydrate prepared according to C above, squeezed dry, allowed to air dry, and then heat cured for 1 hour at 155° C. The treated tow is then cut into a two inch staple, spun into yarn of the well known worsted system and woven into a plain weave fabric. Measurement of the electrical resistance of the fabric at 50% relative humidity reveals that the fabric has a log R value of 13.1, which is a considerable improvement over the log R value of 15+ obtained for similar fabric samples which have not been treated with fibrous alumina monohydrate. The permanence of the anti-static protection provided is illustrated by the fact that after 27 simulated home launderings, using a synthetic detergent, treated fabric samples show no increase in electrical resistance, whereas untreated samples still exhibit log R values of 15+.

The static propensity of the fabric is indicated in terms of direct current resistance in ohms/sq. measured parallel to the fabric surface, at 78° F. in a 50% relative humidity atmosphere. High values, reported as a logarithm (to the base 10) of the resistivity (log R) indicate a tendency to acquire and retain a static charge.

EXAMPLE 14

A section of tufted, cut-pile, white nylon rug is scoured with "Tide"[1] in hot water in an automatic home washer. The thoroughly rinsed rug section is then dried in an automatic home dryer at 'low" heat. A 5" x 12" panel cut from rug is sprayed uniformly with 42 ml. of 1% $Al_2O_3$ boehmite alumina sol prepared according to C above, providing a coverage of 1.5 g. $Al_2O_3/ft.^2$ or 1.8 g. boehmite/$ft.^2$ rug surface. In a similar fashion the control is sprayed with 42 ml. of distilled water. Both test panels are allowed to air dry and are then further dried for 1 hour in a circulating air oven at 110° C.

Log R (resistivity) figures are determined on the test panels equilibrated at 50% R.H., 25° C.

| Panel | Log R |
|---|---|
| Control | 11.9 |
| Boehmite-treated | 10.5 |

The latter figure represents a twenty-seven fold decrease in resistivity (increase in conductivity). Resistivity figures have been shown to correlate well with static development in actual "use tests."

In addition to use in treating woven rugs, fabrics and the like to impart anti-static properties, fibrous boehmite is highly useful in treating yarn and staple prior to weaving or knitting. The filaments treated at this stage are characterized by a uniform coating of the fibrous boehmite along their length; such coating is much more uniform than can be obtained by applying the treating sol to the filaments after they have been incorporated into a fabric.

The sol can be applied to the filaments at any convenient state of textile processing: to the freshly-spun filaments prior to drawing, to the drawn yarn, to a tow

---

[1] Procter & Gamble's trademark for its commercial detergent containing 20 to 25% total actives as about 10% alkyl aryl sulfonate of the dodecyl benzene sulfonate type, about 10% mixture of higher alcohol sulfates and about 5% amide foam builders of the lauryl amide or fatty acid amide type.

prior to cutting, to the staple or to top, roving or yarn at any stage of processing. By carrying out the treatment on the yarn instead of the fabric, uniform coating is attained, as described above; in addition, the anti-static effect of the fibrous boehmite increases ease of textile processing, and the anchoring effect improves dye pick-up, finish and/or size adherence, etc.

In general, about 0.01 to 10%, and preferably 0.1 to 5% of fibrous boehmite can be added to the yarn (based on dry weight). Heating to dry the yarn tends to insolubilize the coating; it is sometimes beneficial to heat for 30 minutes at 110° or higher.

Filaments of synthetic linear polymer advantageously treated with fibrous boehmite are those which are hydrophobic and static susceptible; typical are those spun from polyacrylonitrile, polyhexamethylene adipamide, and polyethylene terephthalate. These polymers are representative of the class comprising polymers and copolymers of acrylonitrile, the fiber-forming linear polyamides, and fiber-forming linear polyesters.

EXAMPLE 15

A 30% solution of colloidal silica containing particles having an average particle diameter of 15 millimicrons, and containing no more than 5% by weight of the silica in the form of particles small than 5 millimicrons or more than 5% in the form of particles larger than 50 millimicrons, is diluted to a concentration of 0.5%. Separately, a dispersion of colloidal alumina in the form of fibrils approximately 300 millimicrons long and about 4 millimicrons in thickness and width is prepared by dispersing product as made by method D above at a solids concentration of 0.5% in water. A film is prepared on plate glass in the following manner: First the glass is scoured with a household cleansing powder containing diatomaceous earth and a synthetic anionic detergent. It is then sponged and rinsed thoroughly with warm water and wiped with a clean, dry cellulose tissue. Both sides of the glass are cleaned in this manner. Immediately thereafter, both sides of the glass are sponged with a dilute colloidal alumina which acts as a mordant for the silica which is to be applied later. Without permitting the colloidal alumina solution on the surface of the glass to dry, the excess alumina is rinsed off with clean running water. The glass is then permitted to drain in a vertical position, and to dry. As soon as both surfaces of the glass are dry, both surfaces are sprayed with the dilute silica sol containing particles having an average diameter of 15 millimicrons. After both sides of the glass have been thoroughly sprayed with the silica, without permitting any of the area of the glass to dry, the excess silica sol is rinsed off in a stream of clean water. The glass is then permitted to drain and to dry. Immediately upon being dried, the glass no longer becomes hydrophobic when rinsed with soap solution and water and dried. The silicon treated glass is then retreated with colloidal alumina and with colloidal silica as before. The clean transparent coating is now twice as thick as before, namely it is now about 40 millimicrons in overall thickness. After baking at 200° C. the surface is rinsed with 0.1% solution of cetyl trimethyl ammonium bromide and is highly hydrophobic and exhibited a low coefficient of friction.

EXAMPLE 16

Undyed jersey stitch body of "Orlon" (Du Pont trademark) is scoured at 160° F. using about one percent of the sodium salt of the sulfate of the condensation product of ethylene oxide and oleyl alcohol plus one percent trisodium pyrophosphate for 15 minutes, then mock dyed at a boil for 30 minutes, cooled and rinsed. Next, the fabric is tumble dried. One fabric sample then is dipped into a dispersion of 2 parts fibrous boehmite (prepared as in example D, above) in 98 parts of distilled water at 27° C. The fabric is then squeezed gently to remove excess reagent and dried in an oven at 90° C. The dried fabric is then scoured as before for 10 minutes at 160° F. A control sample of the sweater fabric is dipped in room temperature water, dried and scoured identically to the treated sample. The treated fabric is noticeably more strecth resistant than the control fabric. Both fabrics are submitted to testing in the Random Tumble Pilling Tester and the results show that the control has a value of 4.2 after 20 minutes while the treated fabric has a value of only 2.6 after 20 minutes.[2] There is evidence that this treatment with fibrous boehmite cuts down the soiling tendency of "Orlon" as judged by a cleaner appearance after pill testing.

EXAMPLE 17

A jersey stitch sweater body of dyed "Orlon," a Du Pont trademark for its acrylonitrile polymer fiber (otherwise known simply as acrylic fiber) is treated as in Example 16. The treated fabric is noticeably more stretch resistant than the control fabric. The Random Tumble Pilling Tester shows for the treated sample, a value of 3.0 after 20 minutes. The Random Tumble Pilling Tester used throughout the examples in the present specification is that described for the standard test as published by Baird, Legere, and Stanley, in "Random Tumble Pilling Tester," Textile Research Journal, 26, 732–735 (September 1956). The treated sample is noticeably less distorted than the untreated control fabrics.

EXAMPLE 18

Interlock knit tubing of "Orlon" (a Du Pont trademark) acrylic fiber is scoured using one percent of the sodium salt of the sulfate of the condensation product of ethylene oxide and oleyl alcohol plus one percent trisodium phosphate at 160° C. for 15 minutes. The temperature is then raised to the boiling point and kept there for 20 minutes. The bath is cooled slowly and the fabrics are rinsed and dried at 90° C. The dried fabric is then treated with fibrous boehmite (prepared as described in example D, above) by dipping the fabric in a two percent aqueous dispersion of such fibrous boehmite for 20 minutes at 140° C. The fabric is then dried, cured 5 minutes at 150° C. and then submitted to scouring using the same scouring conditions as described above. The control fabric is treated identically, except that treatment with fibrous boehmite is omitted. The treated fabric is rated 4.7, 2.2 and 3.8 for the untreated control after a 20-minute test on the Random Tumble Pilling Tester. In addition to a numerical reduction in pilling over the untreated control fabric, there is an indication of reduced soiling resulting from this fibrous boehmite treatment.

EXAMPLE 19

Knit fabric samples of "Orlon" (a Du Pont trademark) acrylic fiber are treated with fibrous boehmite (prepared as described in D, above) as described in Example 16. Next the samples are laundered in tap water at 120–130° F. containing, as active detergents, alkyl aryl sulfonate of the dodecyl benzene sulfonate type, a mixture of higher alcohol sulfates, and amide foam builders of the lauryl amide type or fatty acid amide type. One control fabric sample and one treated fabric sample are laundered as described, rinsed thoroughly and finally dried. Another pair is laundered 10 times as described without drying between launderings. Still another pair is laundered 20 times as described; following each laundering the fabrics are rinsed thoroughly but dried only after the washings have been completed. Repeated launderings tend to increase pilling tendency because surface fuzz is mechanically worked up by the laundering. The static measurements shown in Example 24 also show the durability and effectiveness of the treatment.

[2] On a rating scale where 1.0 equals perfect, no pilling; 2.0 equals slight pilling; 3.0 equals borderline acceptability; 4.0 equals objectionable pilling; and 5.0 equals very objectionable pilling.

All fabric samples are submitted to testing on the Random Pilling Tester. The results are as follows:

The control fabric pilling to a rating of 2.6.

The treated fabric laundered once with hot detergent pilled to a rating of 2.5. The treated fabric laundered 10 times pilled to a rating of 2.1.

The treated fabric laundered 20 times pilled to a rating of 1.5.

These data indicate that the fibrous boehmite treatment is durable and effective through at least 20 launderings.

EXAMPLE 20

Samples of tufted carpet prepared using "Orlon" (a Du Pont trademark) pile fiber are pre-scoured using as a detergent an alkyl aryl sulfonate of the dodecyl benzene sulfonate type for 20 minutes at 140° F. The carpet samples are then dried lying flat on a tray in an oven about 150° F. The carpet is carefully handled to avoid bending while drying.

The dried carpet is treated by dipping the samples in a five percent dispersion of fibrous boehmite (prepared as in example D, above) for 20 minutes at 140° F. The carpet is then dried at 90° C. and cured for five minutes at 150° C. Next, the treated carpet is scoured using a one percent of the sodium salt of the sulfate of the condensation product of ethylene oxide and oleyl alcohol plus one percent trisodium pyrophosphate for 19 minutes at 160° C. The treated carpet together with an untreated control sample is submitted for a 10-hour severe method Random Tumble Pilling test. A dramatic improvement in pilling resistance is evident in the treated sample, over the untreated sample control. There is also evidence that the fibrous boehmite treated sample soils noticeably more than the untreated control.

EXAMPLE 21

A tufted latexed-backed carpet prepared from stock-dyed 15 denier "Orlon" (Du Pont's trademark for its acrylic fiber) is treated with fibrous boehmite as follows: the carpet is pre-scoured using a detergent containing alkyl aryl sulfonate of the dodecyl benzene sulfonate type at 140° F. for 10 minutes. The wet carpet is then treated by dipping same into a four percent aqueous dispersion of fibrous boehmite (prepared as described in example D, above) for 20 minutes at 140° F. This carpet is rinsed after treatment, then dried at 90° F., and finally scoured using a detergent comprising about one percent of the sodium salt of the sulfate of the condensation product of ethylene oxide and oleyl alcohol plus one percent trisodium pyrophosphate for 15 minutes at 140° C. Chemical analysis indicated approximately 0.5 weight percent fibrous boehmite had been picked up by the carpet. These samples are then submitted to a severe method carpet Random Tumble Pilling testing and the results showed that while the control carpet pilled to a rate of 5.0 after five hours, the treated carpet pilled to a rate of only 2.8 in the same test.

EXAMPLE 22

A brown, basic dyed, non-latexed woven carpet of "Orlon" (Du Pont's trademark for its acrylic fiber) is tested with fibrous boehmite coating as follows: the carpet is first scoured twice using as a detergent an aqueous dispersion containing one percent of the sodium salt of the sulfate of the condensation product of ethylene oxide and oleyl alcohol and one percent of trisodium pyrophosphate at 120° F. for 10 minutes. The samples are then rinsed and dipped into a one percent dispersion of fibrous boehmite (prepared as in example D, above) for 20 minutes at 140° F. The treated samples are dried at 90° C. without rinsing, then cured from 3 to 5 minutes at 150° C. The carpet is then scoured using the same detergent at 120° F. for five minutes. Then the carpet is dried. Control samples are treated identically to the treated sample except that no fibrous boehmite is used. The percent weight pick-up is approximately 0.8 percent in the case of fibrous boehmite treated carpet. A treated and an untreated control sample are then submitted for Random Tumble Pilling testing. After five hours of pill testing the control test carpet had a rating of 5.0 while the fibrous boehmite treated carpet had a pill rating of only 2.8.

EXAMPLE 23

An undyed sweater body of "Orlon" (Du Pont's trademark for its acrylic fiber) is treated with fibrous boehmite under the following conditions: using a dispersion of two parts of fibrous boehmite, (prepared as described in example D, above) in 98 parts of water, samples are dipped into such dispersion while the temperature is there maintained at about 27° C. The treated fabric is then squeezed gently to remove excess reagent and dried in an oven at 97° C. The treated fabric is then scoured for ten minutes at 150° C. using as a detergent the sodium salt of the sulfate of the condensation product of ethylene oxide and oleyl alcohol. A control sample of the same sweater fabric is dipped in room temperature water (27° C.) dried and scoured using the same procedures as for the treated fabric except that no fibrous boehmite is used. Both the boehmite treated and boehmite untreated fabric samples are next vat dyed by using one percent of a green vat dye in 9.35 grams per liter per caustic, 9.35 sodium sulfite, and 30 grams per liter sodium chloride. The samples, after being dipped into this vat dye solution for 15 minutes are then rinsed in hot water and then in cold water. The dyed samples are oxidized under the following conditions: 3.75 g.p.d. of 30 percent hydrogen peroxide at 100° F., then raised to 140° F., and kept there for ten minutes and scoured with the same detergent and soda ash for 15 minutes at the boiling point. The results show that the fibrous boehmite dyed fabric dyed to a deeper shade than did the control fabric and that such dye treatment is durable through a vigorous alkaline scour. Tests on other vat dyes show that such dyes are readily absorbed upon the surface of the treated fabric while the control fabrics do not dye readily.

EXAMPLE 24

The fabrics described in Example 18 are tested for electrical resistivity. Conditions: temperature 81° F., relative humidity 25 percent.

Fabric samples are conditioned overnight under the above conditions of temperature and relative humidity.

| Item | Log of resistivity |
|---|---|
| Control sample | 14.7 |
| Fibrous boehmite treated sample: | |
| One laundering | 13.7 |
| Ten launderings | 13.7 |
| Twenty launderings | 13.8 |

Conclusion: Fibrous boehmite imparts durable anti-static protection to these fabrics.

EXAMPLE 25

Fabrics of Example 18 are tested for glazing. An ordinary Westinghouse steam iron is used as a source of heat. The surface temperature of this iron is set at 150° C. Marks are set on an ironing board to insure duplicate positioning of the iron. A 25-cent piece (quarter) is placed in the center of the iron's position and this spot marked. A small strip of fabric is placed over the quarter and the iron placed on the fabric, using the above-mentioned marks as a guide. After 5 seconds the iron is removed. The fibrous boehmite treated fabric repeatedly shows less glaze or surface depression than does the untreated control fabric.

EXAMPLE 26

A woven upholstery fabric from polyacrylonitrile fibers is treated as in Example 16. The treated fabric is characterized for abrasion resistance in comparison with an untreated control sample using a Tabor abraser, research model. The control sample shows signs of definite wear abrasion after 2,200 cycles on the abraser. The treated sample does not reach the same level of wear until 2,750 cycles.

EXAMPLE 27

"Orlon" (Du Pont's trademark for its acrylic fiber) staple (3 denier, 2½-inch low shrinkage) is scoured in a paddle dryer using a sodium salt of the condensation product of ethylene product and oleyl alcohol and then rinsed. Next, a two percent aqueous dispersion of fibrous boehmite (prepared as in example D, above) is applied at 140° F. for 90 minutes by soaking the samples in such dispersion. Next, the samples are dried at 94° C. The dried staple is cured at 275° F. for five minutes. The staple is then scoured using one percent of the sodium salt of the sulfate of the condensation product of ethylene oxide and oleyl alcohol at 160° F. The staple is processed into 2½ cotton count yarn on the cotton system. The yarn then is knit into sweater fabric. A control fabric is knit from yarn from untreated staple. The fabrics are scoured as before and given a standard nitric acid bleaching after which they are tumble dried. One portion of control fabric is treated with fibrous boehmite as in Example 16. The results of a 20-minute test in the Random Tumble Pilling Tester are as follows: Control—5.0; fibrous boehmite treated fiber—4.3; fibrous boehmite fabric treatment—3.8. Therefore, fibrous boehmite applied to "Orlon" staple or its end product fabrics results in textiles with markedly improved resistance to surface distortion than untreated control fabrics.

EXAMPLE 28

An Oxford shirting fabric of "Dacron" (Du Pont's trademark for its polyester fiber) is treated by the procedure described in Example 16 with fibrous boehmite. A control fabric is treated identically, except no application of fibrous boehmite occurs. Control and treated fabrics are submitted for pill testing on the Random Tumble Pilling Tester. Results are as follows:

|  | 30 minutes | 60 minutes |
|---|---|---|
| Control | 5.0 | 5.0 |
| Fibrous boehmite treated | 2.5 | 4.1 |

The conclusion is that fibrous boehmite imparts improved pilling resistance to fabrics of "Dacron".

EXAMPLE 29

A woven blouse fabric of "Dacron" (Du Pont's trademark for its polyester fiber) is treated with fibrous boehmite by dipping same for 20 minutes into a two percent dispersion of fibrous boehmite at 140° F. (fibrous boehmite prepared as in example D, above), rinsed and dried at 90° and then cured for three minutes at 130° C. Finally, it is scoured using one percent of sodium salt of the sulfate of the condensation product of ethylene oxide and oleyl alcohol plus one percent trisodium pyrophosphate (on weight of fabric). Control and treated samples are tested for 60 minutes on the Random Tumble Pilling Tester and the following results obtained:

Control—5.0    Treated—3.5

EXAMPLE 30

Carpet samples prepared as described in Examples 20 and 21 are tested for flammability in comparison with an untreated control carpet sample.

The criterion of flame resistance of a carpet has been set as the ability of a carpet to go out shortly after being ignited either at the center or at an edge. A laboratory test based upon this criterion has been adopted. The test consists of igniting a sample (3" to 6") square of carpet in a draft-free box. This device or box is constructed with transparent plastic sides 12" high and 18" in width. The bottom of the box is made of an aluminum sheet about 2.5 cm. thick. The top of the box is covered with a ½" thick sheet of abestos composition. The top has 25½" diameter ventilating holes. The aluminum bottom has four 1" ventilating holes one in each corner. The entire device stands one inch off the ground and is supported by four rubber feet, one in each corner, to permit ventilation.

Ignition at the center of the carpet is carried out by placing a small hexamethylenetetramine tablet on the carpet, for example "Methenamine" 1756, a trademark of Eli Lily and Company. The tablet is ignited with a match and burns with a very reproducible flame for approximately 100 seconds. Ignition at the edge of the carpet is done with an ignited match which is held parallel with an edge of the carpet along one edge. In both cases the major interest is whether the carpet continues to burn after the igniting source goes out. In these present tests, the relative humidity is about 50%.

The results show that the treated carpet did not burn from center ignition using as the source of ignition a "Methenamine" tablet (a trademark of Eli Lily and Company) whereas the control sample is completely consumed. Therefore, loading of fibrous boehmite greater than four weight percent on the carpet affords significantly reduced flammability.

EXAMPLE 31

A knit sportshirt of "Acrilan" (a trademark of Chemstrand Company for its acrylic polymer fiber) is treated with fibrous boehmite as described in Example 16. Treated "Acrilan" is noticeably more stretch resistant than an untreated control. Static electrical measurements also indicate that the fibrous boehmite in the treated "Acrilan" has superior properties compared with the untreated control fabric:

Control "Acrilan" fiber: Log R is 14.3
Fibrous boehmite treated "Acrilan": Log R is 12.9

EXAMPLE 32

Carpets of "Orlon" (Du Pont's trademark for its acrylic fiber) treated as in Example 20 are submitted for testing under actual use conditions. In the first series of tests shown below, the carpet material comprised undyed tufted carpet of 15 denier woolen spun "Orlon." In the table, $T_1$ designates fibrous treatment sample and $C_1$ the untreated carpet samples.

Next, a blue stock dyed tufted carpet of "Orlon" of 15 denier and woolen spun is treated as in Example 20 with fibrous boehmite. The test results are listed as $T_2$ and $C_2$ below.

CARPET SOILING

| Test No. | Traffic cycles | | |
|---|---|---|---|
|  | 2,000 | 4,000 | 8,000 |
| $T_1$ | 2.3 | 2.7 | 3.3 |
| $C_1$ | 3.6 | 3.6 | 3.9 |
| $T_2$ | 2.1 | 2.0 | 2.4 |
| $C_2$ | 2.8 | 2.6 | 3.2 |

Scale:
1.0=Perfect (no soiling).
3.0=Borderline soiling.
5.0=Very objectionable soiling.

CARPET PILLING

| Test No. | Traffic cycles | | |
|---|---|---|---|
|  | 8,000 | 16,000 | 32,000 |
| $T_1$ | 2.7 | 3.6 | 5.0 |
| $C_1$ | 3.4 | 4.0 | 5.0 |
| $T_2$ | 1.6 | 2.3 | 3.4 |
| $C_2$ | 2.6 | 3.1 | 4.3 |

Scale:
1.0=Perfect.
3.0=Borderline pilling.
5.0=Very objectionable pilling.

Traffic is equal to approximately 1,000 persons a day for about a month for persons coming into the traffic area from varying outside weather conditions (rain, snow, dry and the like).

EXAMPLE 33

An undyed sweater fabric treated as in Example 16 is submitted for soiling tests using a standard Lambert dry soil test. The following results are obtained:

| Results | Lambert dry soil test (percent orig. reflectance retained) | |
|---|---|---|
| | 1st soiling and washing | Second |
| Control | 64.9 | [1] 57.5 |
| Treated | 67.3 | 60.1 |

[1] 100%=Perfect.

EXAMPLE 34

A sweater body treated as in Example 16 with fibrous boehmite is treated by dipping into a 0.8 weight percent sodium of a fatty alcohol phosphate in water (for example, that sold under the trademark "Zelac" NE and NK, a trademark of the Du Pont Company). Room temperature conditions are used for one minute. The fabric is then rinsed and dried. The treated sample is tested for electrical resistivity as in Example 24. Results with the treated fabric show a log of the resistivity equal to 14.0. An untreated control sample had a log of the resistivity equal to 14.7.

EXAMPLE 35

This is an example of the use of fibrous boehmite alumina as an adherent coating on a pretreated aluminum metal panel. A 3% boehmite alumina sol is prepared from a water redispersible powder made by the procedure of C described above. One-eighth inch 2S aluminum panels 4" x 5" are degreased in hot triclene, washed in 5% sodium hydroxide solution, and rinsed several times with water. These clean panels are then immersed as follows: 154 grams of 85% o-phosphoric acid is mixed with 83 grams water, and 12 grams of 50% monoperphosphoric acid is added to this mixture while keeping it at 95° C. The monoperphosphoric acid is prepared by the general procedure described by Heiderich in U.S. Patent 2,765,216 using $P_2O_5$ and $H_2O_2$. While the monoperphosphoric acid bath is kept at 95–100° C. the panels are dipped in the bath. Considerable foaming occurred during this time. On removing the treated panels, they are washed with 2% nitric acid and finally with distilled water. After drying these panels, they are next dipped in the 3% fibrous boehmite sol, drained, and baked 5 minutes at 450° C. Two of these panels are boiled for 30 minutes in water to complete the sealing operation. An unsealed boehmite-coated panel is dipped in a 1% red acid dye (eosin), rinsed, and then sealed for 30 minutes in boiling water. In this case a bright red permanently sealed colored aluminum panel results.

The phosphate primer coat aids in the adhesion of the boehmite to the aluminum metal, and as a matter of fact, this fibrous boehmite coated aluminum panel may be bent through almost 180° without visible cracking or flaking of the coating.

A boehmite-treated and sealed panel made as described above is immersed in an aerated 5% ammonium chloride solution and its rate of corrosion compared after a week's immersion with an aluminum panel which has not been treated with fibrous boehmite. After one week's immersion the fibrous boehmite-coated panel is practically unaffected, whereas the untreated panel is very badly pitted and corroded.

An air-gas flame is impinged directly on the surface of the fibrous boehmite surface treated panel prepared as described above and also on an untreated 2S aluminum sheet of the same thickness. After 15 seconds the air-gas flame burns a ½" hole through the untreated aluminum panel whereas the fibrous boehmite treated aluminum surface is completely unaffected, that is, the film retained its integrity and transparency.

In addition to the monoperphosphoric acid primer, conventional primers are also used in a similar fashion. For example, with a chromate conversion coating using 5 grams of hexavalent chromium per liter for 8 minutes at a temperature of 100° F. at a pH of 2 improved adhesion is obtained. Manganese, zinc, and iron phosphate coatings are also used on aluminum as well as steel to improve adhesion of the fibrous boehmite to the metal surface.

EXAMPLE 36

A ³⁄₁₆" thick piece of 316 stainless steel is heated up to 150° C. and a 2% dispersion of fibrous boehmite is made as described in method C above and is sprayed on the surface until a uniform film is formed. This fibrous film is then dyed with a milling red dye. A bright red stainless steel surface results.

EXAMPLE 37

This example will illustrate the use of a fatty acid coated fibrous boehmite film on the surface of glass as a lubricating film for the glass surface. Forty 2 oz. hexagonal glass bottles are dipped individually in a 1% fibrous boehmite dispersion prepared as in method C described above, dried at 110° C., and then dipped in a 1% sodium stearate-soap solution. The surface is then rinsed with distilled water and dried. Forty similar bottles but untreated are also obtained. These bottles are then tumbled while rotating on rollers in a cardboard carton for 8 minutes. During this 8-minute period the tumbling is interrupted at intervals in order to allow the bottles to cool. At the end of the 8-minute period it is found that 15 of the boehmite and soap treated bottles are unbroken whereas only 4 of the untreated bottles remained unbroken, thus showing that the soap plus boehmite treatment markedly improves the resistance of the bottles to breakage upon impact and rubbing.

EXAMPLE 38

A 6" square ½" thick piece of high nickel steel (sold by the Lukens Steel Company as HY–80) is dipped into a fibrous boehmite dispersion prepared as in example C above. Then it is allowed to air dry at room temperature. Next, this so coated metal sample together with an untreated sample are heated for one hour at 2000° F. in an atmosphere of air. The fibrous boehmite coated metal displays a slight scale formation which is readily flaked off with an aqueous spray. The untreated control sample has a thick adherent scale which is not removed by the aqueous spray. The fibrous boehmite treated sample can be immediately hot rolled whereas the untreated control sample is not suitable for immediate hot rolling.

EXAMPLE 39

Heavy cardboard panels (Bristol board) are spray painted with two coats of a commercial alkyd resin white paint, allowing a 48-hour drying period between coats and a 30-day drying period after the second coat and prior to use. The paint film is visually smooth and continuous and has a gloss of 16 as measured with a Gardner Portable 60° Glossmeter. Prior to applying the fibrous boehmite to the surface, the surface is rinsed quickly with acetone.

As an anti-soil treating agent, the fibrous boehmite prepared according to example C above, is applied over the painted surface. This fibrous boehmite product is diluted to contain 3 weight percent fibrous boehmite with distilled water. The coated painted surface after application of the fibrous boehmite is air dried for about 10 hours.

Carbon blacks of four different particle sizes are used to soil the above described treated and untreated painted panels. These carbon blacks are obtained from Godfrey L. Cabot, Inc., and are described in detail in a publication of that company entitled, "Cabot Carbon Blacks Under the Electron Microscope," vol. II, No. 10, October 1949, as follows:

| Synthetic soil | Manufacturer's designation | Particles diameter arithmetic mean[a], mu | Nitrogen surface area,[b] $M^2/g$. |
|---|---|---|---|
| 1 | Carbolac 1 | 410 | 1,000 |
| 2 | Kalista | 30 | 315 |
| 3 | Sterling R | 40 | 75 |
| 4 | Sterline R | 80 | 22 |

[a] Particle size measurements made by means of the electron microscope.
[b] Brumauer, Emmett and Teller's nitrogen adsorption method (J. Am. Chem. Soc., 60, 309 (1938)).

Particle distribution curves in electron micrographs of these carbon blacks are presented in the above Cabot application.

Soiling is accomplished by brushing of these synthetic soils onto the treated and control test panels with a soft camel hair brush until the surface is soiled to saturation; i.e., continued soiling causes no further darkening of the panel. The excess soil is removed by vacuuming without touching the surface of the panel; the reflectance of the soiled area is measured; the panel is wiped free of all removable soil with soft paper tissue; reflectance is again measured; the panel is washed thoroughly with a sponge saturated with a 2% solution of potassium oleate soap, rinsed, dried, and a final reflectance measure made.

Reflectance is used as a measure of the degree of soiling. Reflectance, the percentage of total incident light reflected from a service surface, is measured with a model 6–10 reflectometer made by the Photovolt Corp., New York, N.Y., fitted with a model M 610Y search unit, tristimulus green filter and standardized at a reflectance of 19.5 in all cases.

The untreated control areas of the paint film are extremely receptive to all three synthetic black soils and after vacuuming, appear essentially black, as denoted by the very low reflectance values obtained. By contrast, those areas treated with the fibrous boehmite appear to be virtually "soil-proof."

Dry wiping does not change reflectance of the treated and untreated soil areas greatly, indicating that most of the soil is permanently entrenched in surface cracks and holes. The control areas appear almost black in relation to the areas which have been treated with the fibrous boehmite, which areas appear virtually "soil-proof." Maximum anti-soil effectiveness is obtained when the size of the fibrous boehmite fibrils is less than that of the soil against which protection is desired.

When the test panels are washed, then dried, resoiled, vacuumed, wiped, and again washed and dried, the permanence of the anti-soil treatment to washing is demonstrated. Washing is accomplished by scrubbing painted surfaces, treated and untreated, thoroughly with a cellulose sponge soaked with a 2% natural potassium oleate soap, rinsed, and oven dried for 15 minutes at 110° C.

Instead of using heavy cardboard panels spray-painted with a commercial alkyd resin white paint the foregoing tests are repeated using No. 1 white pine boards sanded smooth and finished by the brushing on of two coats of a high-grade alkyd spar varnish and thereafter drying for several months, then rubbing down one-half of the varnished area with No. 00 steel wool until the surface is smooth and lustrous. Thereafter the treated and untreated finished areas are coated with fibrous boehmite as in the preceding example. From reflectance data it can be demonstrated that treatment with the fibrous boehmite renders these painted surfaces essentially soil proof to this type of soil.

Similarly, sections of fir plywood are sanded down and spray painted with two coats of a white, pigmented, nitrocellulose lacquer and allowed to dry for 24 hours time between coats with three weeks drying time after the second final coat. After soiling as described, reflectometer tests demonstrate that the fibrous boehmite gives excellent soil-proofing.

EXAMPLE 40

A section of polyethylene film is brush-coated over part of its area with the fibrous boehmite dispersion as described in Example 39. The air dried, treated film is then soiled with the soiling compound prepared by the method of Sanders and Lambert, "An Approach to a More Realistic Cotton Detergency Test," J. Am. Oil Schem. Soc., May 1950. This soil is sprinkled as a dust liberally over the treated and untreated areas. The loose soil is then blown from the polyethylene film. All of the soil is readily blown free from the fibrous boehmite treated area but only the excess is removable from the untreated area. The untreated area soils easily with an evenly distributed dust film, whereas the treated area is substantially dust free.

EXAMPLE 41

A 7" x 20" piece of white cotton tufted carpeting having a one-half inch long cut pile is spray-treated using a fibrous boehmite aqueous dispersion prepared according to the method of C above so as to cover one-half of its area with a total of 1.5 weight percent fibrous boehmite based on the total weight of the carpeted sample.

The "hand" or harshness of the treated and control test areas of the carpet sample compare favorably after drying.

The test carpet is soiled by covering the pile surface with a heavy deposit of vacuum cleaner sweepings collected at a large hotel. The sweepings are passed through a 200-mesh per inch screen prior to use to remove large particles and foreign materials. The soil is thoroughly worked into the pile (both in the treated and control areas) with a stiff bristled brush. At this point it is readily apparent that the untreated pile is adsorbing the soil in a sponge-like manner while the fibrous boehmite treated pile is resisting soiling. A sharp difference between the treated and untreated control areas is observable at this point.

The carpet sample is then thoroughly cleaned with a conventional tank-type vacuum cleaner, vacuuming being continued until no further soil can be removed from the sample. From the reflectance of both areas it is concluded the fibrous boehmite treated portion of the carpet gives a definite soil retardant effect to the carpet.

Instead of using a cotton rug sample, there is used beige-colored, wool-rayon, 50/50 blend, 1¼ inch long straight piled floor covering as the test material. Treatment as before with the fibrous boehmite is carried out. Greatly improved soil resistance is shown in the fibrous boehmite treated carpet.

EXAMPLE 42

A fibrous boehmite dispersion prepared according to method C above, is applied to a blend of one-inch raw cotton and waste cotton staple in a spray applicator inserted in the air suction line between the opening and picking operation of a cotton mill. This operation is carried out at an application ratio of 1.5 pounds of fibrous boehmite dispersion containing 3.0 weight percent fibrous boehmite per 100 pounds of blended cotton. Treated fibers are processed into yarn, have fewer ends down and are of higher strength than those of untreated control cotton.

EXAMPLE 43

100 parts by volume of distilled water adjusted to pH 5.0 is charged into a glass reaction vessel fitted with a thermometer, reflux condenser, heater, and inlet and exit tubes connected through a circulating pump.

A 0.250 molar solution in water of $AlCl_3 \cdot 6H_2O$ and a 0.758 molar aqueous solution of $NH_4OH$ are added simultaneously into the turbulent circulating stream created by the pump in the circulating lines. These solutions are fed into the circulating line over a period of 6 hours at such rates relative to each other as to maintain the pH of the material in the reaction vessel within the range of about pH 4.0–5.0 throughout the period. The contents of the reaction vessel are kept at about 80° C. throughout.

The above process gives as a starting material for the preparation of fibrous boehmite a translucent, opalescent alumina sol having a pH of 4.34. The starting material has an alumina concentration calculated as $Al_2O_3$ of 0.129 molar and a chloride concentration (in excess of the chloride stoichiometrically equivalent to the $NH_4+$ ion present) of 0.0621 molar. The value of $\theta$ is under one minute. Electron microscope examination of this starting sol shows that there is present no anisotropic crystalline alumina, the only crystals present being readily vaporized ammonium chloride which disintegrate under electron bombardment. This starting sol does not form coherent, transparent films on glass.

The above alumina sol is heated for one hour in an autoclave at 150–160° C. and is thereby converted to a very viscous, translucent sol of alumina monohydrate having the boehmite crystal lattice and exhibiting streaming birefringence. It is found by examination with the electron microscope that the alumina is fibrous. The pH and the specific conductivity of the boehmite sol are 2.72 and 43,200 micro mhos/cm., respectively.

After dialyzing this sol through cellophane and against distilled water for 15 days at room temperature, the pH and specific conductivity are 5.80 and 13.5 micro mhos/cm., respectively. The dialyzed boehmite sol is less turbid than the original boehmite sol but still rather viscous and it still exhibits streaming birefringence when agitated slightly. Electron microscope examination shows that the dialyzed sol now contains as a solid only fibrous boehmite, the ammonium chloride crystals having been eliminated. The fibrils of boehmite have diameters of about 3 millimicrons and axial ratios of greater than 100:1. The sol readily forms transparent films when dried down on glass substrate.

One-half part by weight of fibrous boehmite, 400 $M^2/g.$, prepared as above, is deionized by ion exchange and dried by azeotropic distillation followed by venting and mixed with 9.5 parts by weight of granular polyethylene and the components milled together until the mixture is homogeneous.

A 15 mil film is molded from this mix by pressing at 8000 p.s.i.g. and 145° C. between aluminum metal foils. After pressing it is found that the aluminum foil adheres very strongly to the polythene.

A control experiment with no fibrous boehmite in the polythene yields a film from which the aluminum foil readily parts.

Textiles are treated using a fibrous boehmite alumina sol prepared generally as above but using a different starting material, a basic aluminum chloride solution with an $Al_2O_3$:Cl ratio of 1:1 and with a concentration of 2% $Al_2O_3$, by heating in an autoclave for 1 hour at 160° C.

Part of the chloride in the resulting sol is removed by an ion exchange resin.

"Orlon" acrylic fiber cloth, "Dacron" polyester cloth, glass fiber cloth and cotton cloth are immersed in the alumina sol, removed and then dried. These are then immersed into a red dye solution of eosine and dried. In every case the sample containing the alumina is dyed a deeper color than a control which is untreated.

Boiling both the test and control samples shows that in the latter case all of the dye is removed but with the fibrous boehmite treated product practically all of the dye remains in the cloth.

Analogous results are obtained with other materials such as paper.

EXAMPLE 44

A basic aluminum chloride solution containing 24% $Al_2O_3$ and an $Al_2O_3$:Cl atomic ratio of 1:1 is used for this preparation. The solution is diluted down to 3% $Al_2O_3$ and 3,000 parts by weight of this water-clear solution is placed into a Pyrex autoclave reactor fitted with a spiral vented capillary top. The autoclave reactor is surrounded with water and the combination is heated up in 4 hours to 160° C. and held at that temperature for 3¾ hours. The autoclave and contents are then cooled to about 58° C.

After heating, the product is a semi-rigid gelatinous mass which readily liquifies upon agitation, and becomes pourable. The sol shows flow birefringence between crossed "Polaroid" sheets and the electron micrographs at 50,000 diameters and 25,000 diameters show that the micron long fibrous particles are slightly aggregated in a side-to-side fashion. An electron diffraction pattern of this dried down sol shows that alumina monohydrate having the boehmite crystal lattice is the alumina phase present. With X-ray diffraction, small particle-size alumina monohydrate having the boehmite crystal lattice is indicated with one extra line at 2.73 A. Titration of this sol for percent unpolymerized alumina yields 19.2% while pH is 3.18.

When this sol is air dried on a glass plate, at a thickness corresponding to about 5 milligrams $Al_2O_3$ per sq. centimeter, a coherent film is obtained.

A fibrous boehmite sol made by polymerizing a basic aluminum chloride solution by heating at 160° C. as above is gelled to a pH of 10, washed free of salt until the $Al_2O_3$ ratio is 113:1, and the cake is repulped with distilled water and hydrochloric acid to 5% $Al_2O_3$ and $Al_2O_3$:Cl ratio of 43:1.

This sol is diluted with distilled water to 3% $Al_2O_3$ and sprayed uniformly onto a carpet which is a beige-colored, wool-rayon 50/50 blend, ¼ inch long, straight piled carpet. The sol is rubbed thoroughly into the pile and allowed to air-dry for 24 hours at 75° C. and 50% relative humidity. The treated dried carpet is then brushed-vacuumed thoroughly to remove excess alumina and to restore the pile to its orginal condition.

A control is prepared by spraying some of the same type of carpet with distilled water. The appearance of the two carpets is about the same but the carpet treated with alumina has a slightly harsher "hand" than the control. The treated carpet is much more resistant to soiling than the control and was more easily cleaned.

A smooth surface printing-stock paper and a rougher surface coating-stock paper are brush coated with a 3% deionized $Al_2O_3$ sol prepared as just described. After air-drying, the treated papers are found more resistant to soiling than untreated controls. Soil which did adhere would readily be removed from the treated papers by dry wiping with a clean cloth or paper tissue.

EXAMPLE 45

A basic aluminum chloride solution is prepared from ether-extracted aluminum metal dust and aluminum chloride hexahydrate solution; that is, 5 mols of aluminum metal dust are added to a solution one molar in aluminum chloride at a temperature of about 80° C. This solution contains about 22% $Al_2O_3$ and an $Al_2O_3$:Cl ratio of 1:1. This solution is diluted to 2% $Al_2O_3$ with distilled water and then heated in a Pyrex container set in an autoclave heated in one hour to 160° C. and held for 4 hours. The resulting product is a translucent, thixotropic, gel-like material, which electron microscope examination shows contains fibrous particles. Vigorous agitation of this sol in a Waring Blendor for several minutes reduces the viscosity markedly.

A quaternary ammonium ion exchange resin, IRA–400, is transformed from the chloride to the hydroxide form with 10% sodium hydroxide and washed thoroughly with water and then the resin is converted to the bicarbonate form by slurrying in water and contacting it with an excess of Dry Ice immersed in the water. After this, the resin is filtered and drained.

A portion of the sol prepared above is deionized by using this bicarbonate ion exchange resin by slowly adding the resin while agitating and gently sparging with nitrogen gas until the pH of the sol reaches 5.0–5.5.

Water is removed from a fibrous boehmite alumina sol, prepared as above, by azeotropic distillation with N-butanol. The butanol is then removed by drying under vacuum at 80° C. to produce a fluffy, dry product. This product is added to tobacco at the rates of ½, 1, 2, 3, 4, 5, and 6% by weight based on the weight of tobacco. Cigarettes prepared from the tobacco thus treated are improved in taste and mildness, as reported by a number of observers. The smoke is found to contain less tar than an untreated control. When the tobacco is used for pipe tobacco, the pipe bowl is found to be cleaner and dryer than when used with an untreated control tobacco.

EXAMPLE 46

Using the procedure of U.S. Patent No. 2,763,620, a 1 N solution in water of a commercial sodium aluminate having an $Al_2O_3/Na_2O$ mol ratio of 0.966/1 is prepared. An 0.5 N aqueous solution in water of hydrogen chloride is also made. These two solutions are added gradually, simultaneously over a one-hour period to a reaction vessel originally containing 300 parts by volume of distilled water which had been acidified with hydrochloric acid with pH 4.25.

The sodium aluminate solution and the hydrochloric acid solution are added with agitation to the reaction vessel at such rates relative to each other as to maintain the liquid mass in the vessel at about pH 4.25 throughout. The temperature of the reaction mass is kept at about 95° C. throughout the addition. A total of 1,000 parts by volume of sodium aluminate solution and 1,440 parts by volume of the hydrogen chloride solution are added during the one-hour period.

The above process gives as a starting material for the preparation of the fibrous boehmite an opalescent, stable aluminum sol analyzed at 0.867% $Al_2O_3$ by weight having a pH of 4.20 and a specific conductivity of 24,000 micro mhos/cm.

Such aqueous dispersion of alumina is heated for 16 hours at 150 to 160° C. in a sealed glass vessel. There is thereby obtained a viscous, turbid, slightly thixotropic, stable sol of fibrous boehmite. The sol has a pH of 2.0 and a specific conductivity of 31,500 mhos/cm. The sol exhibits streaming birefringence when stirred between crossed polarizing sheets.

The fibrous boehmite sol is purified to remove excess sodium chloride by static dialysis for 66 hours against distilled water using cellophane films. The dialyzed sol has a pH of 4.0 and a specific conductivity of 255 micro mhos/cm.

The dialyzed sol when poured onto a glass or mercury surface readily dries to a smooth, transparent, continuous, coherent solid film of boehmite. As so cast, the film is water sensitive, but upon heating to 600° C. to 1000° C. for a few hours, it is converted to a water-insensitive film, not attacked by strong acids, such as hydrochloric acid.

EXAMPLE 47

Aluminum nitrate $(Al(NO_3)_3.9H_2O)$ is heated for 8 hours at 275° C. The white product is micropulverized to a white, fine powder. This intermediate contains an $Al_2O_3:NO_3$ ratio of 1.6:1. Water is added to this powder to form a slurry containing 8.7% $Al_2O_3$. It is then autoclaved at 160° C. for three hours.

The resulting sol is dried down on a glass plate to form a clear, coherent, hard, abrasion resistant, water resistant film.

Part of this sol is gelled by addition of dilute ammonium hydroxide to a pH of 8.3 and dried for 12 hours at 180° C. The product is a lumpy solid which is easily micropulverized. The resulting white, free-flowing dry powder is easily dispersible in water to form a sol containing 2.1% alumina, .15% nitrate. The sol is dried down on glass plate to form a hard, coherent, abrasion-resistant film.

EXAMPLE 48

Two hundred seventy parts by weight of aluminous sodium aluminate (44% $Al_2O_3$) dissolved in 1,000 parts by weight of distilled water and 1,000 parts by weight of 18% $HNO_3$ solution are added simultaneously to a heel of 1,000 parts by weight of water at such rates that the pH of the heel is maintained from 5 to 7. The addition requires 20 minutes and the temperature rises from 27 to 43° C. The precipitate is filtered and washed free of excess nitrate ions. The cake is diluted with water to an $Al_2O_3$ concentration of 5.38% and autoclaved for 3.5 hours at 160° C.

Part of this sol is gelled by the addition of dilute ammonium hydroxide to a pH of 8.0 and dried for 4.0 hours at 225 to 250° C. The lumpy product can be easily ground to a white, free-flowing dry powder. This powder is readily dispersed in water and forms an opalescent sol containing 3% $Al_2O_3$ and 0.08% $NO_3$. The sol is dried on a glass plate to form a hard, coherent abrasion-resistant film.

EXAMPLE 49

1171 parts by weight of aluminum nitrate $$(Al(NO_3).9H_2O)$$

are heated for 12 hours at 280° C. and the lumpy product is micropulverized by analysis. This product contains an $Al_2O_3:NO_3$ ratio of 2.8:1. It is slurried in water to give a concentration of 8.4% $Al_2O_3$ and autoclaved for 3 hours at 160° C. to produce a sol of fibrous boehmite.

This sol is deionized by the addition of Nalcite HCR resin in the hydrogen form and Amberlite IRA 400 resin in the bicarbonate form and stirred at room temperature. The resin is screened off to give an opalescent sol of pH 0.1, specific resistance of 500 ohms/cm. and containing 5.46% $Al_2O_3$, 0.24% nitrate, 2.79% unpolymerized alumina. On drying down on a glass plate, this deionized sol gives a clear, coherent film.

EXAMPLE 50

Six parts of distilled water and 0.75 part of 70% nitric acid are added to 20 parts of a filter cake prepared as follows:

50 parts by weight of aluminum sulfate $$(Al_2(SO_4)_3.18H_2O)$$

dissolved in 100 parts of water and 34 parts fo sodium carbonate dissolved in 408 parts of water are added simultaneously to a heel of 120 parts of distilled water at such a rate that the pH of the heel is maintained at 6.7±2. The addition required a total of 15 minutes. The resulting slurry is filtered and washed with 10 bed volumes of distilled water to remove the sodium sulfate. The cake is reslurried in water and heated to boiling to remove absorbed $CO_2$ and the aluminum hydroxide separated by filtration. The resulting cake contained 7.3% $Al_2O_3$, 0.027% carbonate, 0.2% sulfate, 0.002% sodium.

The resulting slurry prepared using such filter cake is autoclaved for 3 hours at 150° C. to produce a sol of fibrous boehmite.

The sol is cast on a glass plate and dried at 100° C. to form a clear, hard film.

EXAMPLE 51

A dry, free flowing, redispersible powder is prepared from aquasol by spray-drying, according to procedure D above. A translucent sol which analyzes as follows is spray dried.

| | |
|---|---|
| $Al_2O_3$ _____percent__ | 5.05 |
| $CH_2COOH$ _____do____ | 2.37 |
| $L_f$ _____millimicrons__ | 287 |
| Specific surface area_____$M^2/g$__ | 307 |

The product is free-flowing, 100% dispersible in water, and analyzed as follows:

| | |
|---|---|
| $Al_2O_3$ _____percent__ | 72.2 |
| $CH_2COOH$ _____do____ | 8.0 |
| $L_f$ _____millimicrons__ | 277 |
| Specific surface area_____$M^2/g$__ | 281 |
| Average fibril length as determined by the spray mist technique_____ | 80 |

A dry product prepared as above is used to reinforce foam rubber in the manner described below.

A fibrous boehmite powder containing 69.2% $Al_2O_3$ and 9.49% acetic acid with surface area=$M^2/g$. is dispersed in distilled water to form baths in the concentration range 0.1% to 0.4% solids.

Commercially produced Talalay process foam, made from a blend of natural rubber and GR–S (butadiene-styrene) latices is cut in foot square test pieces which are dip treated in one case in distilled water and other cases in the boehmite dispersions by submersing them, squeezing repeatedly under the liquid surface and then passing through wringer rolls to remove excess sol. The treated foam samples are dried in a circulating air oven at 120° C. for 45 minutes, allowed to equilibrate in the laboratory for 24 hours before testing in accordance with ASTM D 1055–56T.

After fatigue exposure of all foam samples by flexing them 250,000 times to 50% of their original height, the load bearing capacity of the treated samples is found to be greatly increased in comparison with the untreated foam and to vary in proportion to the boehmite content found on the foam by analysis as follows:

| Percent boehmite solids on foam (by analysis) | Percent increase in load bearing capacity over untreated control for Foam of absolute density 0.075 g/cc. when loaded to 50% deflection |
|---|---|
| 0.6 | 40 |
| 0.9 | 48 |
| 1.1 | 73 |
| 1.5 | 95 |
| 3.1 | 121 |

EXAMPLE 52

A polyurethane foam mixture was made as follows:

| | |
|---|---|
| Polyester Resins [1] _____grams__ | 1,049 |
| Emulsifier (polyoxyethylated vegetable oil)__do____ | 15 |
| Water _____cc__ | 38 |
| N-methyl morpholine_____cc__ | 15 |
| Filter aid (Johns-Manville Super Floss)____grams__ | 30 |

[1] Polyester Resin—Reaction product of diethylene glycol, adipic acid and trimethylol propane in a 13/13/1 molar ratio having the following properties:

| | |
|---|---|
| Viscosity _____cps__ | 14,000 |
| Acid number_____ | 2.0 |
| Specific gravity_____ | 1.185 |
| Water _____percent__ | 0.15 |
| Hydroxyl number_____ | 63 |
| Solids _____percent__ | 100 |

432 grams of "Hylene" TM (mixed toluene diisocyanate isomers) (E. I. du Pont de Nemours and Company) is mixed into the foam mixture for 10 seconds, using a 5-quart Hobart kitchen mixer, the paddle turning at a low speed. As quickly as possible, the foams were poured into a mold, 13″ x 15″ x 19″. Foaming takes place in about 15–30 seconds and is complete in 2 minutes. The foam was cured overnight at room temperature.

The polyurethane foam so made was cut into 1″ cubes which were thoroughly deaerated by mechanical means for 1 minute in a 2.81% fibrous alumina monohydrate dispersion, squeezed dry and dried in an air-circulating oven at 110° C. for 1 hour. The 1″ cubes were subsequently treated in polysilicic acid as follows: a 2% solution of polysilicic acid was made by diluting sodium silicate to 2% $SiO_2$ and deionizing to a pH of 3.4 with Nalcite-HCR resin (cation exchange resin—National Aluminite Corp.); the cubes were then given a 1 minute mechanical working in the polysilicic acid solution at room temperature and dried at 100° C. for 1½ hours. The polysilicic acid treatment was found not to be effective without the pretreatment with fibrous alumina monohydrate.

The rate of wicking in any direction was ⅛–1 inch per second. The rate of absorption for foam made in an identical manner except that it had not been treated as described, with less than 1/16 inch per second. This rate of wicking was measured after thorough washing with water and wringing in a washing machine wringer. The rate was observed by immersing the foam in a water solution at room temperature containing a small amount of nigrosine black water-soluble dye and watching the rise of water containing dye.

The improved rate of absorption is further demonstrated by the amount of water picked up in a short time in accordance with the following test procedure: The foam sample is thoroughly wet out and put through a washing machine wringer. The sample is then weighed to the nearest 1.0 gram, and the weight recorded is "wet weight." It is then placed carefully on the surface of water in a pan deep enough to allow the foam to float without touching the bottom. After exactly 5 seconds, the sample is lifted from the water. The sample is again weighed and the difference between the final weight and the "wet weight" represents the 5-second water absorption of the foam.

Six 1″ x 3″ size foams prepared as above described and treated with fibrous alumina monohydrate, followed by a treatment with polysilicic acid, had an initial average absorption of 37.5 grams. After washing for one hour in a 0.1% "Tide" detergent [3] solution, the average absorption was 35.7 grams. After washing in plain water for 1 hour, the average absorption was 54.1 grams. A control sample given no treatment absorbed about 2 grams of water.

The foams treated as above described retained their hydrophilicity after 5 days of two 1-hour washings per day at which time the test was discontinued.

The preparation of polyurethane foam structures by reacting water with free isocyanate radical-containing organic polymeric products is described in "German Plastics Practice" by De Bell et al., 1946, pp. 316 and 463–465. Polyurethane foams applicable to this invention may be produced by employing reactants and methods, such as disclosed in U.S. Patents Numbers 2,282,827

---

[3] "Tide" (Procter & Gamble Company)—This particular detergent is known to contain, in addition to the active ingredient, well over 50% (sodium) phosphates (Chemical Industries, 60, 942. July 1947). Analysis shows the composition to be substantially as follows:

| | Percent |
|---|---|
| Sodium lauryl sulfate_____ | 16 |
| Alkyl alcohol sulfate_____ | 6 |
| Sodium polyphosphate_____ | 30 |
| Sodium pyrophosphate_____ | 17 |
| Sodium silicates and sodium sulfate_____ | 31 |

(Rothrock), 2,284,637 (Catlin), 2,284,896 (Hanford et al), 2,292,443 (Hanford), 2,333,639 (Christ et al), 2,358,475 (Pratt et al.), 2,374,163 (Rothrock), 2,787,601 (Detrick et al.), and U.S. applications Serial Numbers 369,240 (Barthel), filed July 20, 1953, now U.S. Patent No. 2,788,335; 381,745 (Mitchell), filed September 21, 1953, now U.S. Patent No. 2,850,464; 383,370 (Barthel), filed September 30, 1953, now U.S. Patent No. 2,833,730; 395,843 (Roussel), filed December 2, 1953, now U.S. Patent No. 2,842,506; and 405,036 (Mitchell), filed January 19, 1954, now U.S. Patent No. 2,814,600. In general, the free isocyanate radical-containing organic polymers embrace a wied variety of compounds and are prepared by reacting a polymeric organic substance containing a plurality of groups containing active hydrogen atoms with an organic compound containing as the sole reacting group a plurality of isocyanate groups.

An organic compound containing as the sole reacting group a plurality of isocyanate groups may be any of the poly-NCO compounds, i.e., any polysicyanate. The preferred compounds are those having two groups of the formula —NCO. Examples of this class are: 2,4-toluene diisocyanate, 2,6-toluene diisocyanate, m-phenylene diisocyanate, 4-chloro-1,3-phenylene diisocyanate, 1-chlorophenylene 2,4-toluene diisocyanate and naphthalene-1,5-diisocyanate.

Polymeric organic substances containing a plurality of groups containing active hydrogen may be selected from a wide variety of polyfunctional compounds, including polyamines, polyalcohols, aminoalcohols, polyhydroxy ethers, polyhydroxy esters, polyamides, polythiols, polysulfonamides and various mixtures of these types. Typical of many organic compounds which are useful in this connection are ethylene glycol, diethylene glycol, glycerine, diethanolamine, N-ethyl-ethanolamine, triethanolamine, adipamide, m-phenylene diamine, propylene diamine, sulfanilamide, p-aminophenol, succinamide and 2,4-toluene diamine. Other long chain polyhydroxy and polycarboxy compounds useful in this invention are alkyd resins containing terminal hydroxyl and carboxyl groups. Examples of the alkyd resin reactants are: glycols, glycerine and trimethylol propane reacted with dibasic acids such as adipic, phthalic, succinic, maleic and carbonic.

The term "active hydrogen" is used herein to denote hydrogen atoms which display activity according to the Zerewitinoff tests, as described by Kohler in Journal of American Chemical Society, 49, p. 3181 (1927).

A tertiary amine catalyst is preferably used during the formation of the foam to accelerate the reaction between the isocyanate and active hydrogen-containing compounds and also, by proper selection of the catalyst, to control the rate of foaming and the cell structure of the foam. The catalyst may be omitted and a longer time for curing may be used, or the reaction may be speeded up by the use of elevated temperatures. However, it is much simpler and more practical to add the tertiary amine catalyst to cause the reaction to take place rapidly and permit the final curing at room temperature. The more basic amines appear to be the most effective as catalysts, and those of relative low volatility are preferred so that they will not escape to any objectionable degree during the reaction and so they will not impart to the product an objectionable odor. The following tertiary amines are illustrative of those particularly useful as catalysts in this reaction: N-methyl morpholine, triethylamine, diethylcyclohexylamine, dimethylhexadecylamine, triethanolamine, pyridine, quinoline and 3-methyl-isoquinoline. The amount of catalyst may range from essentially none at all to several times, by weight, the amount of water used.

Any inorganic negative colloidal material composed of particles having at least one dimension on the average less than 500mμ may be employed as the final (top-coating) agent. A preferred agent for this purpose is finely divided polysilicic acid. As specific examples of other inorganic negative colloidal materials there may be mentioned colloidal silica, colloidal titania, commercially available bentonites, attapulgite, ferric oxide and stannic oxide.

EXAMPLE 53

A polyurethane foam was produced as in Example 52. Part of the polyurethane foam was cut into 1" cubes which were thoroughly deaerated by mechanical means (wringer rolls) for 1 minute in a 2% fibrous alumina monohydrate dispersion, squeezed dry and then dried in an air-circulating oven at 110° C. for 1 hour. The cubes were subsequently treated (mechanically worked by wringer rolls) in a 2% solution of "Ludox" LS (colloidal silica; U.S. Patent 2,577,485) for 1 minute, squeezed dry and then dried at 110° C. for 1.5 hours. The "Ludox" LS treatment was found not to be effective without pretreatment with fibrous alumina monohydrate.

The rate of wicking in any direction was ⅛–1" per second, whereas an untreated sample's rate was less than ¹⁄₁₆" per second.

The initial average weight of absorption per 5 seconds was 37.1 grams. After washing for 1 hour in 0.1% "Tide" detergent solution, the average absorption was 35.3 grams. After washing in plain water for 1 hour, the average absorption was 53.3 grams. A control sample given no treatment absorbed about 2 grams of water.

EXAMPLE 54

A polyurethane foam mixture was produced as follows: 300 grams of "Pluronic" L-61 (polyether block copolymer containing 90% propylene oxide with 10% polyethylene oxide and having a molecular weight of approximately 2000) and 27.3 grams of toluene diisocyanate were heated together at 120° C. with stirring under a nitrogen blanket for 2 hours. An additional 64.2 grams of toluene diisocyanate were slowly added at 120° C. during 30 minutes. The reaction mixture was then quickly cooled to 30° C. This prepolymer was used to make a foam by the following procedure:

|  | Grams |
|---|---|
| Prepolymer | 50 |
| Emulsifier (polyoxyethylated vegetable oil) | .05 |
| N-methyl morpholine | .05 |
| Water | .05 | were thoroughly mixed quickly, then poured in a mold to foam. After the foam had raised to its maximum height, it was placed in an oven at 75° C. to cure for 4 hours. This foam was very soft and springy, but did not wet well with water.

Part of the polyurethane foam so made was cut into 1" cubes which were throughly deaerated by mechanical means (wringer rolls) for 1 minute in a 2.81% fibrous alumina monohydrate dispersion, squeezed dry and dried in an air-circulaitng oven at 110° C. for 1 hour. The 1" cubes were subsequently treated as in Example 52 with a 2% solution of polysilicic acid for 1 minute while being worked by wringer rolls at room temperature, squeezed dry, and dried at 110° C. for 1.5 hours. As in Example 52, the polysilicic acid treatment was found not to be effective without pretreatment with fibrous alumina monohydrate.

The rate of wicking for the polyhydroxy ether foams so treated was similar to that of Example 52.

The initial average weight of absorption per 5 seconds was 36.9 grams. After washing for 1 hour in a 0.1% "Tide" detergent solution, the average absorption was 35.1 grams. After washing in plain water for 1 hour, the average absorption was 52.9 grams. The treated foam retained its hydrophilicity after 5 days of two 1-hour washings per day at which time the tests were discontinued.

EXAMPLE 55

A polyurethane foam is made by mixing 432 grams of "Hylene" TM (mixed toluene diisocyanate isomers—E. I. du Pont de Nemours and Company) for 10 seconds in a Hobart kitchen mixer operating at low speed, with a mixture consisting of:

| | |
|---|---|
| Selectron 6201 resin (Pittsburgh Plate Glass Company) grams__ | 1,049 |
| Emulsifier (polyoxyethylated vegetable oil) grams__ | 15 |
| Water cc__ | 38 |
| N-methyl morpholine cc__ | 15 |
| Filter aid (Johns-Manville Super Floss) grams__ | 30 |

As quickly as possible, the foams are poured in the mold, 13" x 15" x 19". Foaming takes place in about 15–30 seconds and is complete in 2 minutes. The foam is cured overnight at room temperature.

The polyurethane foam so made is cut into 1" cubes which are thoroughly deaerated by mechanical means for 1 minute in a 2.81% fibrous alumina monohydrate dispersion, squeezed dry and dried in an air-circulating oven at 110° C. for 1 hour. The 1" cubes are subsequently impregnated with a 2% solution of a polyvinyl methyl ether/maleic anhydride copolymer by a 1-minute mechanical working in the copolymer solution at room temperature and dried at 110° C. for 1½ hours. The polyvinyl methyl ether/maleic anhydride copolymer treatment is found not to be permanent without pretreatment with fibrous alumina monohydrate.

The rate of wicking in any direction is ⅛–1 inch per second. The rate of absorption for foam made in an identical manner except that it has not been treated as described, is less than 1/16 inch per second. This rate of wicking is measured after thorough washing with water and wringing in a washing machine wringer. The rate is observed by immersing the foam in a water solution at room temperature containing a small amount of nigrosine black water-soluble dye and watching the rise of water containing dye.

The improved rate of absorption is further demonstrated by the amount of water picked up in a short time, in accordance with the following test procedure. The foam sample is thoroughly wet out and put through a washing machine wringer. The sample is then weighed to the nearest 1.0 gram and the weight recorded is "wet weight." It is then placed carefully on the surface of water in a pan deep enough to allow the foam to float without touching the bottom. After exactly 5 seconds, the sample is lifted from the water. The sample is again weighed and the difference between the final weight and the "wet weight" represents the 5-second water absorption of the foam.

Six 1" x 3" x 3" size foams prepared as above described and treated with fibrous alumina monohydrate, followed by a treatment with polyvinyl methyl ether/maleic anhydride have an initial average absorption of 38.3 grams. After washing for 1 hour in 0.1% "Tide" detergent solution, the average absorption is 36.5 grams. After washing in plain water solution for 1 hour, the average absorption is 55.7 grams. A control sample given no treatment absorbs about 2 grams of water.

The foams treated as above described retain their hydrophilicity after 5 days of two 1-hour washings per day at which time the test is discontinued.

Any hydrophilic organic polymer (hydroxyl or carboxyl groups or precursors to such groups through hydrolysis such as ester, amide, ether or anhydride) may be employed as the final (topcoating) agent. In addition, the polymer may contain groups such as amino, amide, nitro, sulfonate or other groups capable of interacting with water. As specific examples of useful solid hydrophilic organic polymers there may be mentioned polyvinyl alcohol, acidic vinyl acetate copolymer, cyanoethyl cellulose, sodium carboxymethyl cellulose and a copolymer of polyvinyl methyl ether and maleic anhydride. The hydrophilic organic polymer is conveniently applied from an aqueous dispersion or solution thereof containing from 0.001% to 10%, and preferably from 1% to 3% by weight of polymer.

EXAMPLE 56

Polyurethane foam manufactured as in Example 55 and treated with the fibrous alumina monohydrate dispersion and dried as in Example 55 is post-treated in a similar manner as in Example 55, except that a 2% solution of polyvinyl alcohol is used. Results substantially the same as those of Example 55 are obtained.

EXAMPLE 57

A polyurethane foam mixture is produced as follows: 300 grams of "Pluronic" L–61 (polyether block copolymer containing 90% propylene oxide with 10% polyethylene oxide and having a molecular weight of approximately 2000) and 27.3 grams of toluene diisocyanate are heated together at 120° C. with stirring under a nitrogen blanket for 2 hours. An additional 64.2 grams of toluene diisocyanate are slowly added at 120° C. during 30 minutes. The reaction mixture is then quickly cooled to 30° C. This prepolymer is used to make a foam by the following procedure:

| | Grams |
|---|---|
| Prepolymer | 50.0 |
| Emulsifier (polyoxyethylated vegetable oil) | .05 |
| N-methyl morpholine | .05 |
| Water | .05 | are thoroughly mixed quickly, then poured in a mold to foam. After the foam has risen to its maximum height, it is placed in an oven at 75° C. to cure for 4 hours. This foam is very soft and springy but does not wet well with water. It is post-treated as described in Example 55 with like result.

A salient feature of the present invention is that by reason of its practice a previously hydrophobic polyurethane is made permanently hydrophilic. This property, in addition to its unaltered properties of "feel," appearance, wear-resistance, heat-resistance, permanent softness and freedom from bacterial degradation, that give it customer appeal, makes polyurethane foam sponges desirable for household and industrial usage. The absorptive and wettable polyurethane foam sponge, as described in this invention, is characterized by the following improvements: Flushing the cleaning agents and dirt from the foam is improved; less physical effort is required to squeeze or wring the water from the foam; the foam picks up more water when squeezed under the surface of a fluid; and the hydrophilic foams absorb more water from the surface in a given time since the foam is more permeable.

Specific improved products, although not limited to these which can be made by application of the above invention, in addition to an all-purpose household and industrial scrubbing and wiping sponge mentioned before, include an all-purpose household and industrial scrubbing and wiping mop and a quick-drying sponge mop which is less susceptible to bacterial degradation.

Other sponge uses, such as disclosed in Banigan et al., U.S. Patents 2,280,022 and 2,295,823, and Saffert, U.S. Patent 2,138,712, may apply to the improved product and provide functional uses and wider utility than any sponge herebefore known. It will be understood that plastic foams treated so that they become hydrophilic by the treatment of the present invention may be used for any purpose for which their hydrophilic properties render them suitable.

What is claimed is:
1. A solid state, organic plastic in the form of a solid film coated with and bonded to fibrous boehmite, said plastic being negatively charged with respect to the fibrous boehmite.

2. As an article of manufacture, a solid state base material in the form of a solid organic plastic film having at least one surface coated with and bonded to fibrous boehmite, said surface being negatively charged with respect to the fibrous boehmite, said fibrous boehmite coating bearing a negatively charged topcoat material.

3. An article of claim 2 wherein the base material is a film of regenerated cellulose and the fibrous boehmite is in the form of an undercoat bonded to the regenerated cellulose film and to the negatively charged topcoat material, whereby the topcoat is firmly adhered to the film base.

4. A woven fabric of fibers coated with and bonded to fibrous boehmite, said fiber being negatively charged with respect to the fibrous boehmite.

5. A woven fabric of claim 4 wherein the fibers are acrylic fibers.

6. A woven fabric of claim 4 wherein the fibers are polyamide fibers.

7. A woven fabric of claim 4 wherein the fibers are polyester fibers.

8. A polyurethane foam the pore walls of which are coated with and bonded to an undercoat comprising essentially fibrous boehmite and with a topcoat comprising a hydrophilic organic polymer containing functional groups selected from the class consisting of hydroxyl, carboxyl and radicals hydrolyzable to hydroxyl and carboxyl groups.

References Cited in the file of this patent

UNITED STATES PATENTS

| | | |
|---|---|---|
| 1,953,201 | Tosterud | Apr. 3, 1934 |
| 2,085,129 | Stoewener | June 29, 1937 |
| 2,323,387 | Edelstein | July 6, 1943 |
| 2,560,707 | Stark | July 17, 1951 |
| 2,798,049 | White et al. | July 2, 1957 |
| 2,859,148 | Altenpohl | Nov. 4, 1958 |
| 2,915,475 | Bugosh | Dec. 1, 1959 |
| 2,917,426 | Bugosh | Dec. 15, 1959 |
| 2,920,983 | Bugosh | Jan. 12, 1960 |

FOREIGN PATENTS

| | | |
|---|---|---|
| 776,398 | Great Britain | June 5, 1957 |
| 792,624 | Great Britain | Apr. 2, 1958 |

UNITED STATES PATENT OFFICE
CERTIFICATE OF CORRECTION

Patent No. 3,013,901                              December 19, 1961

John Bugosh

It is hereby certified that error appears in the above numbered patent requiring correction and that the said Letters Patent should read as corrected below.

Column 13, line 1, for "(aquadag-Acheson Colloids)" read -- ('Aquadag'-a trademark of Acheson Colloids Company).

Signed and sealed this 22nd day of May 1962.

(SEAL)
Attest:

ERNEST W. SWIDER
Attesting Officer

DAVID L. LADD
Commissioner of Patents